Jan. 17, 1939.  A. J. HARRISON  2,144,570
MACHINE FOR APPLYING JOINT OR EDGE STRIPPING TO WIRE MESH SCREEN
Filed Aug. 26, 1937  15 Sheets-Sheet 1

Inventor:
Alma J. Harrison
by his Attorneys
Howson & Howson

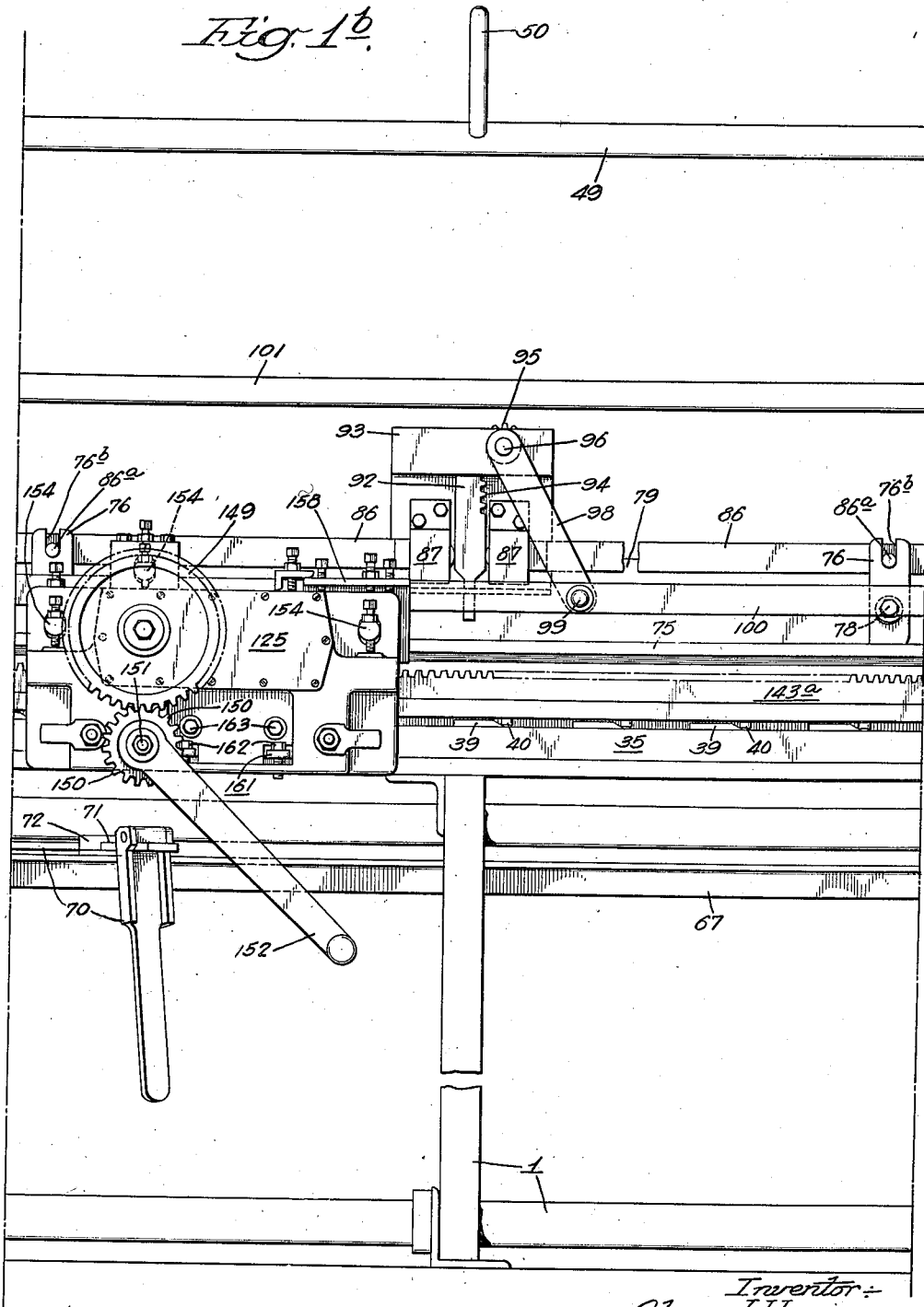

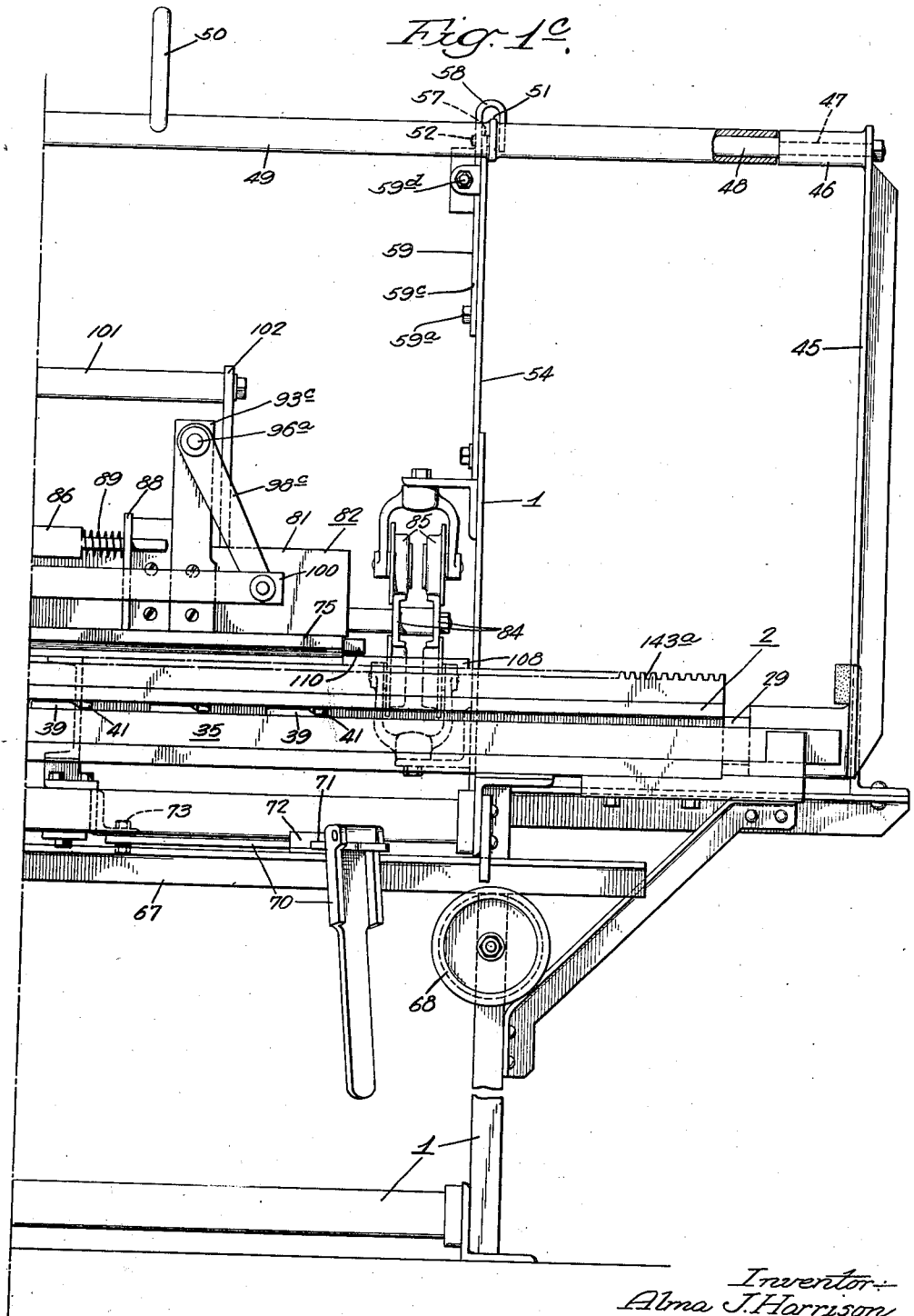

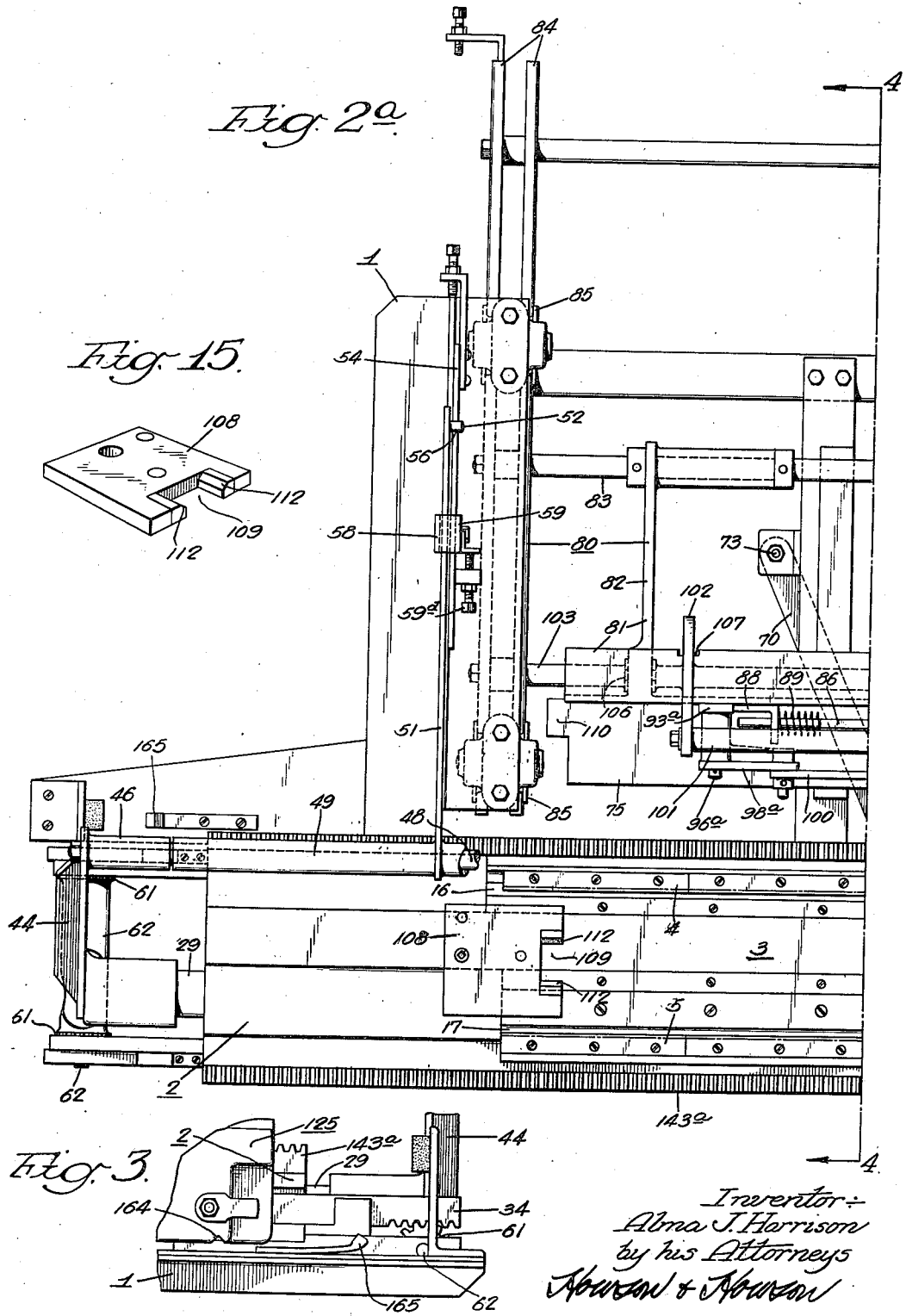

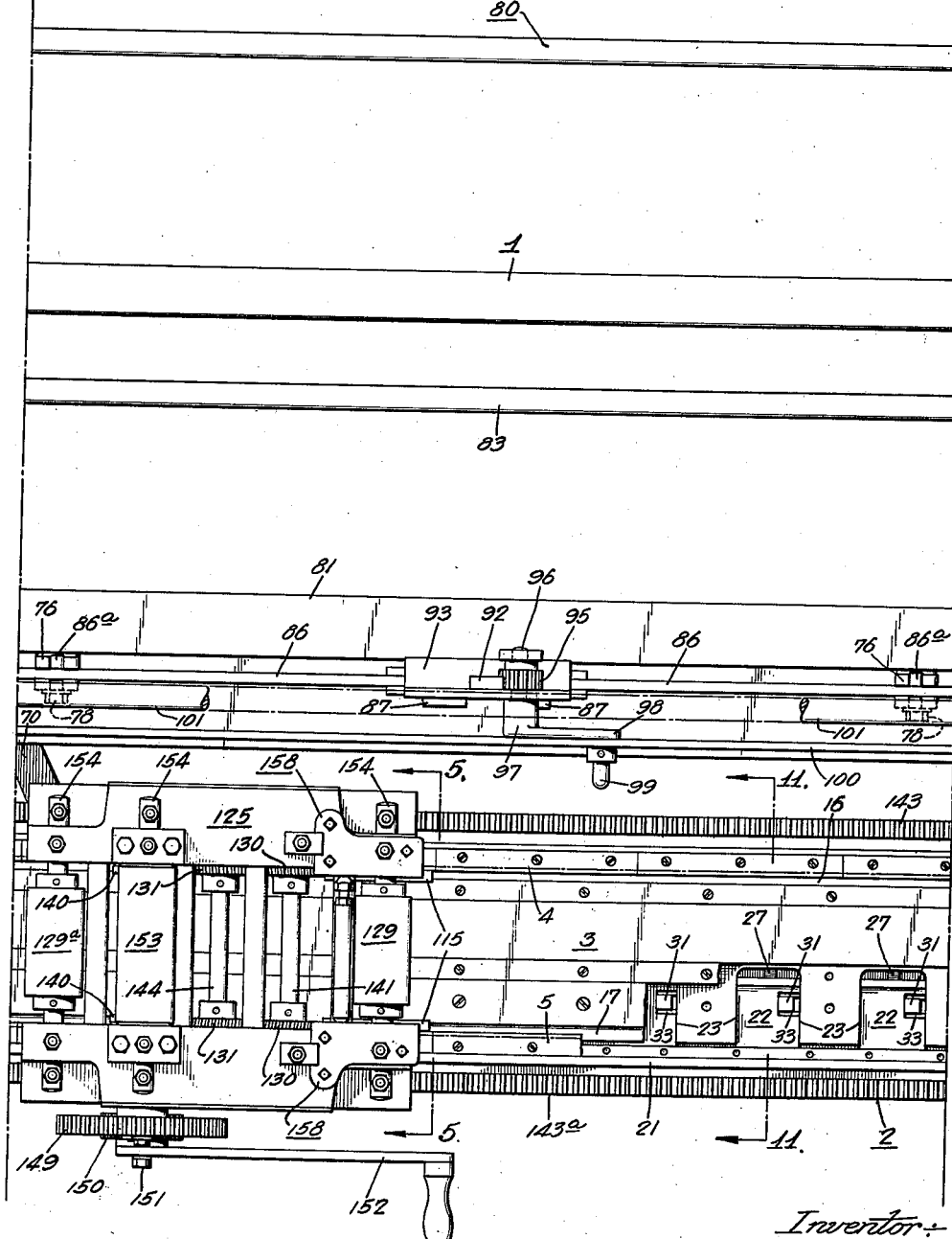

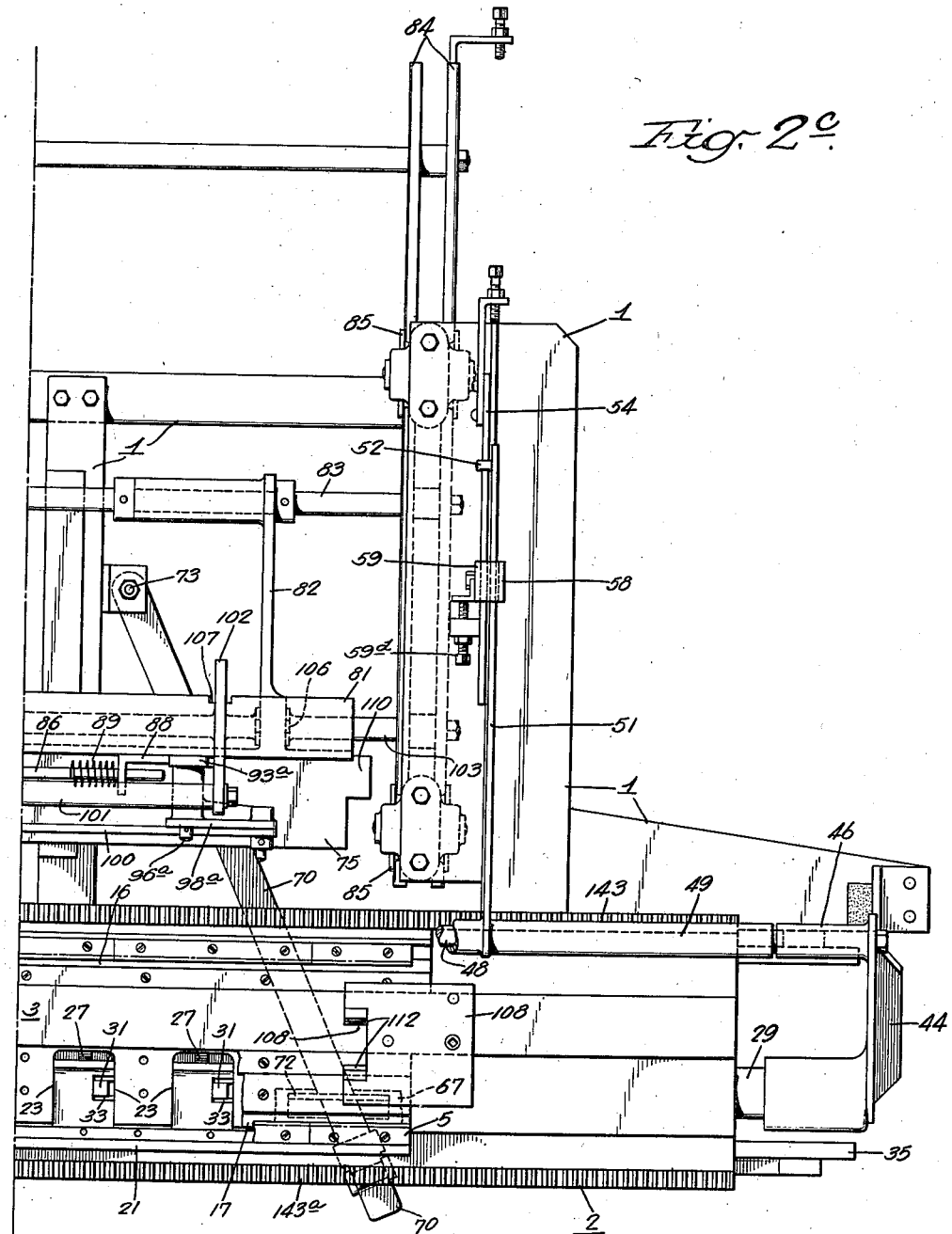

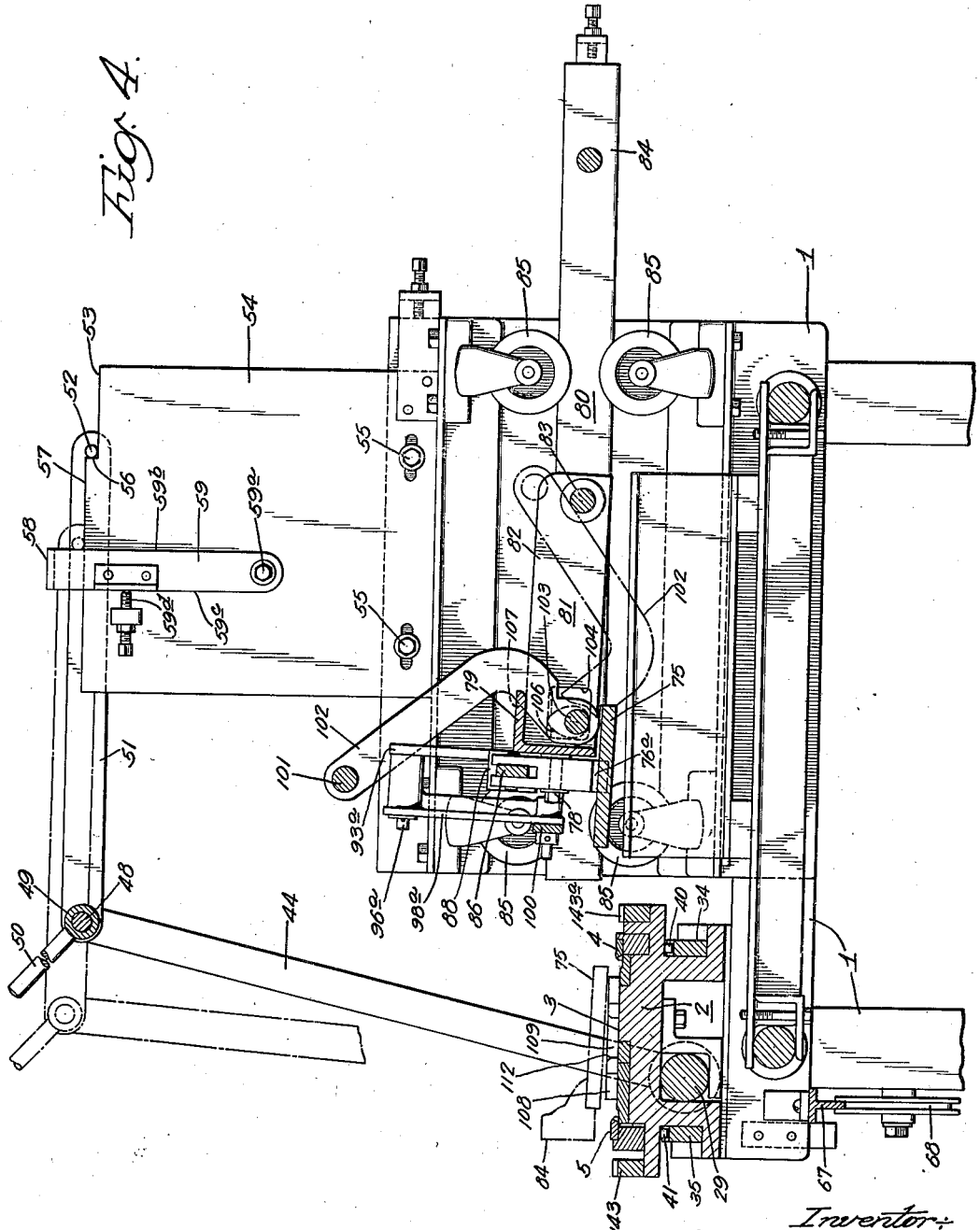

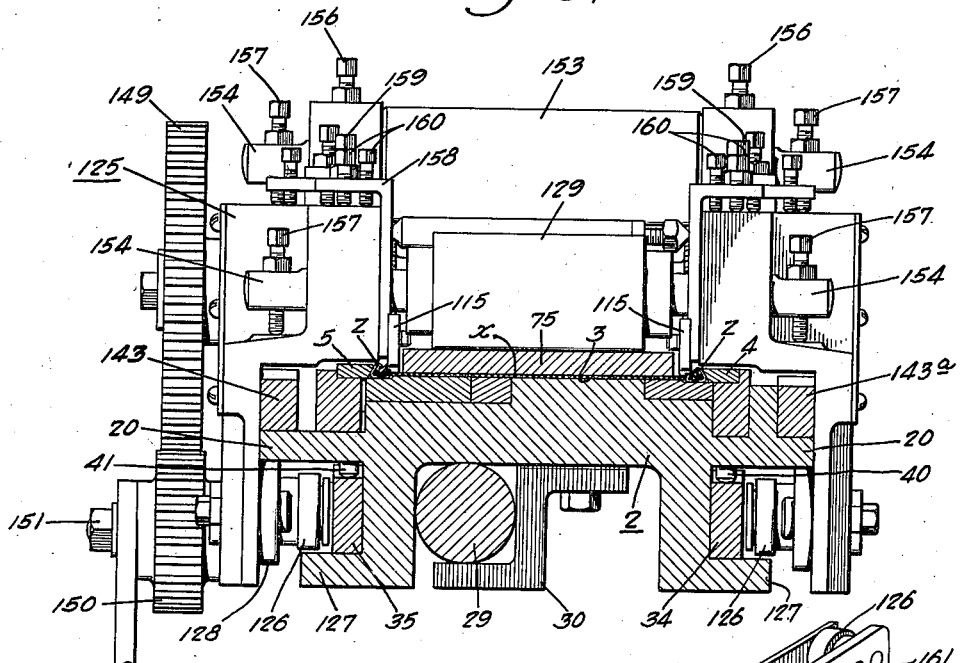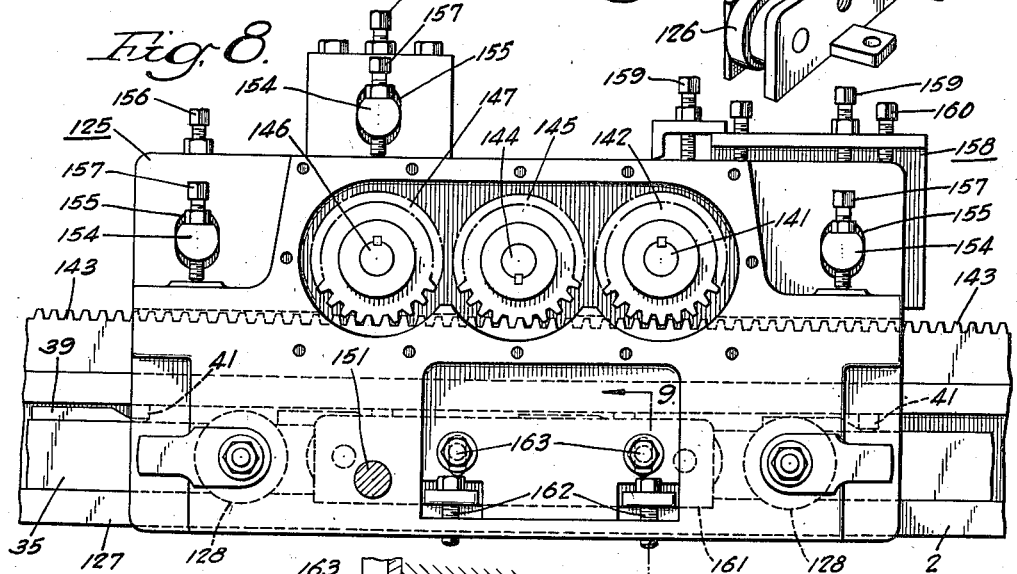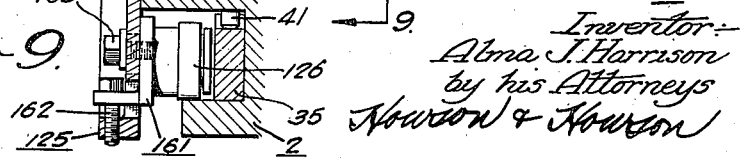

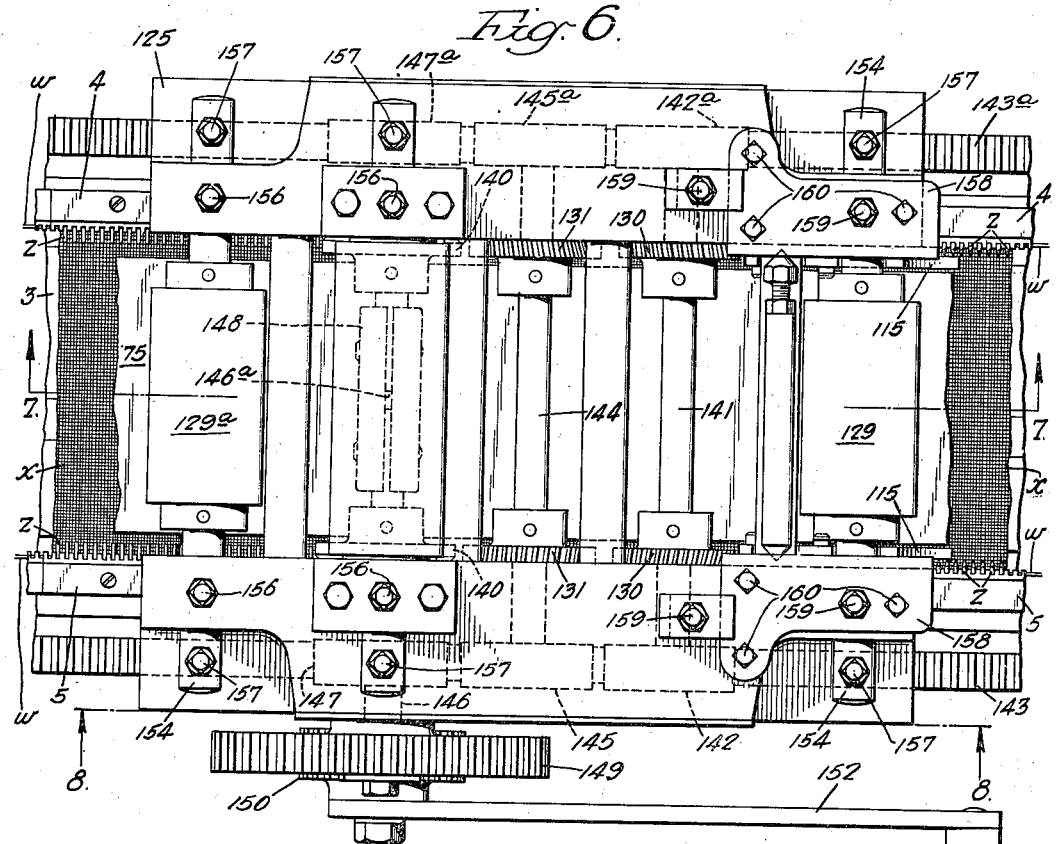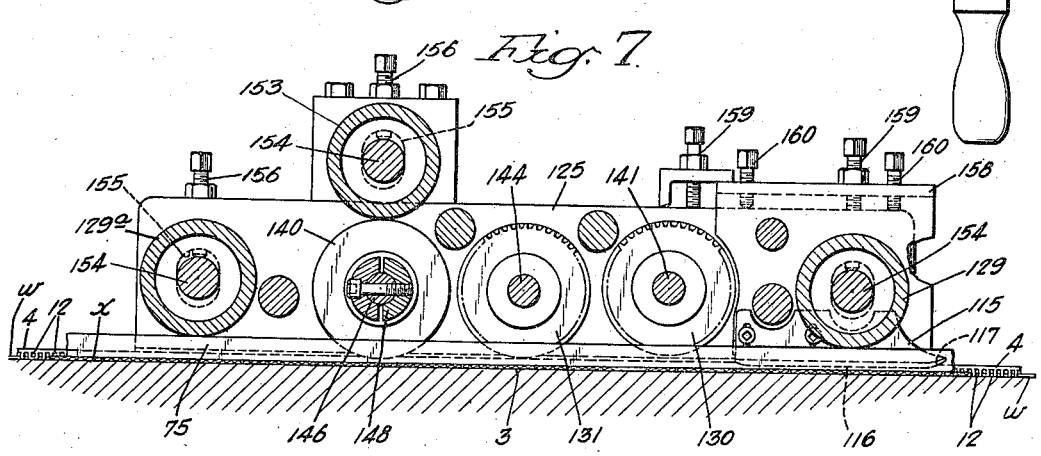

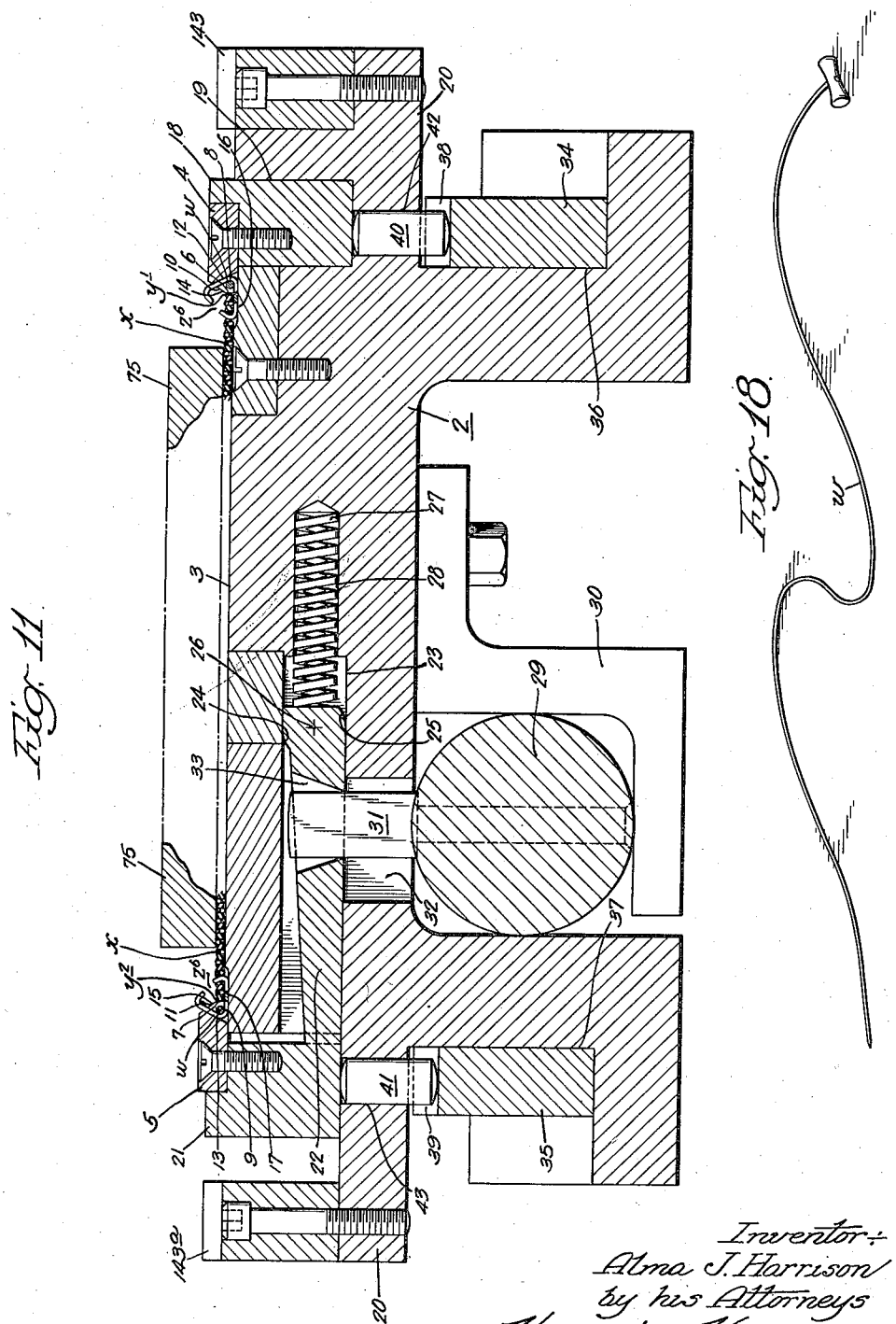

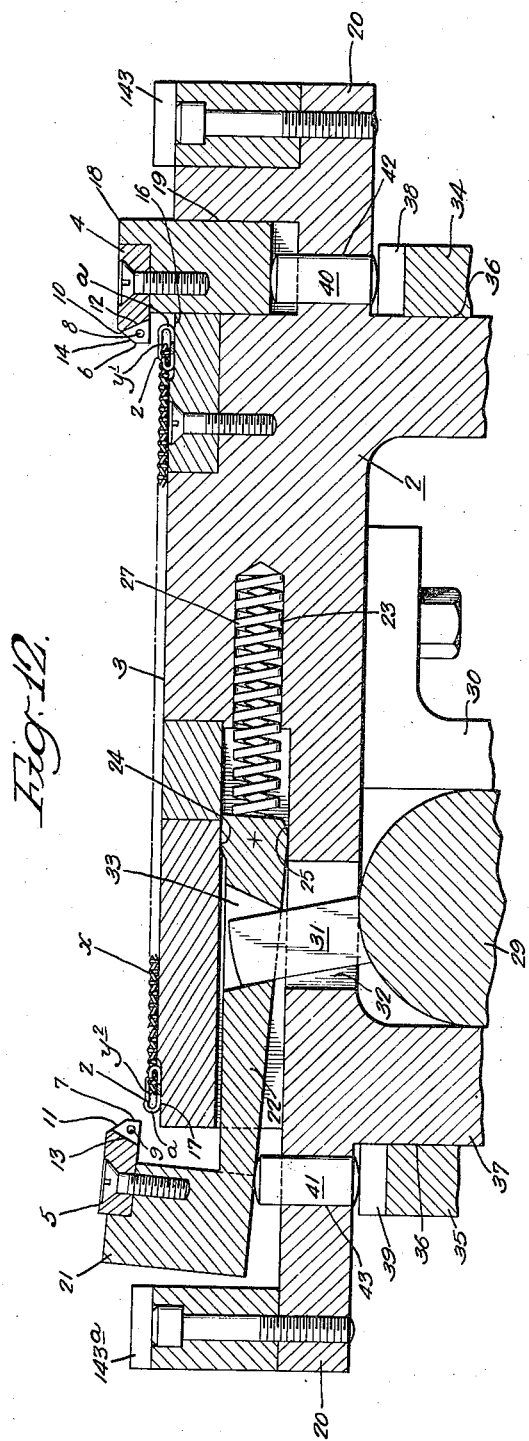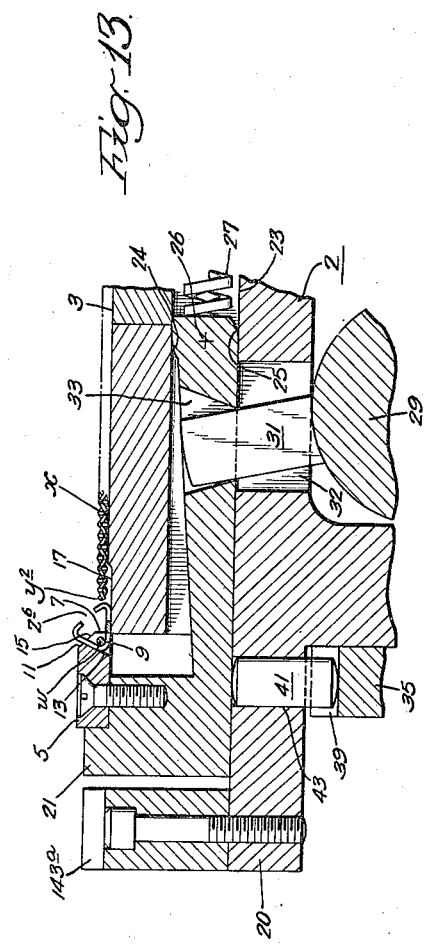

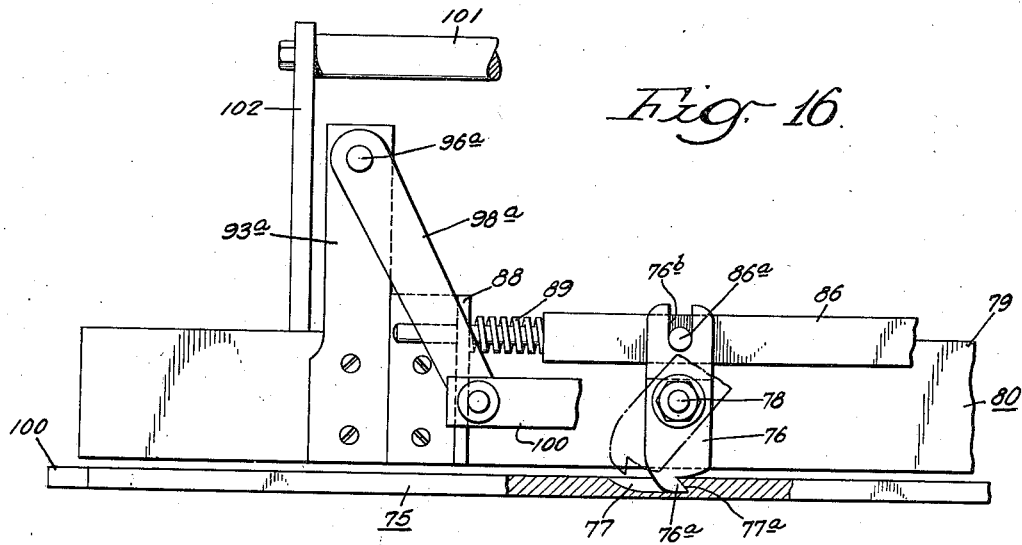
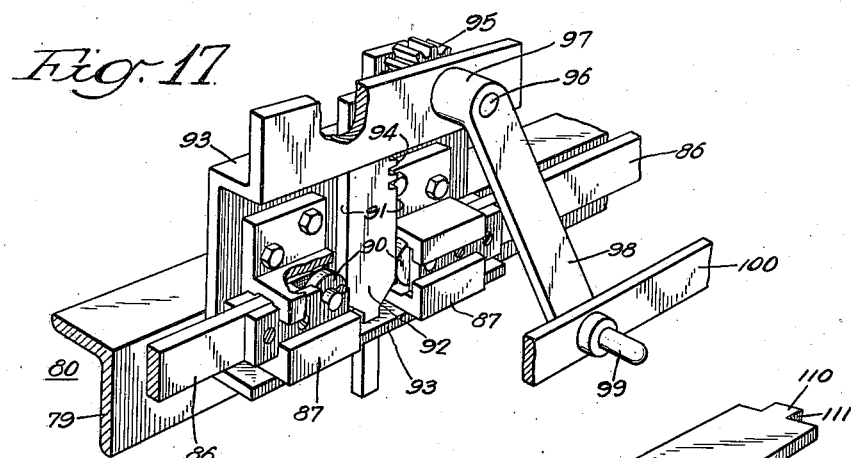
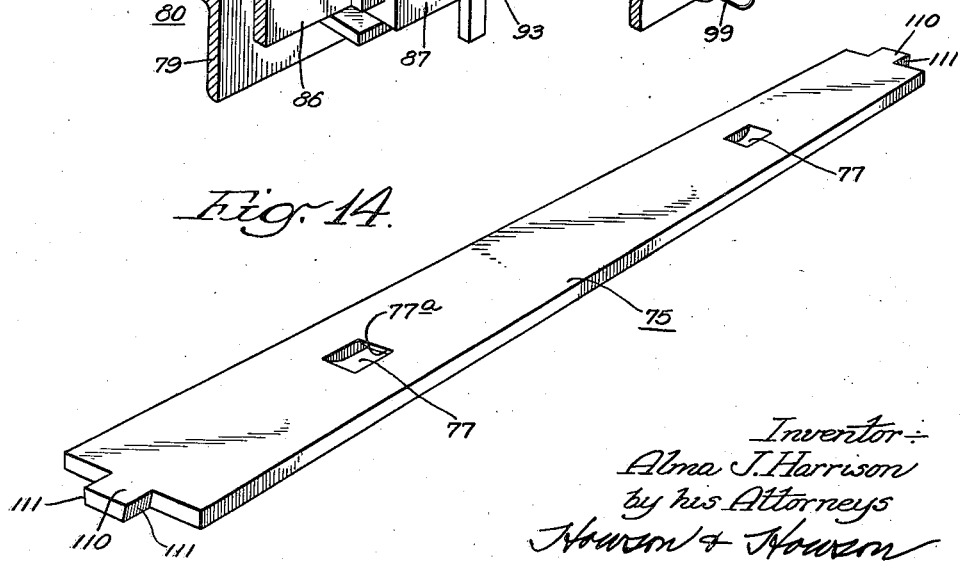

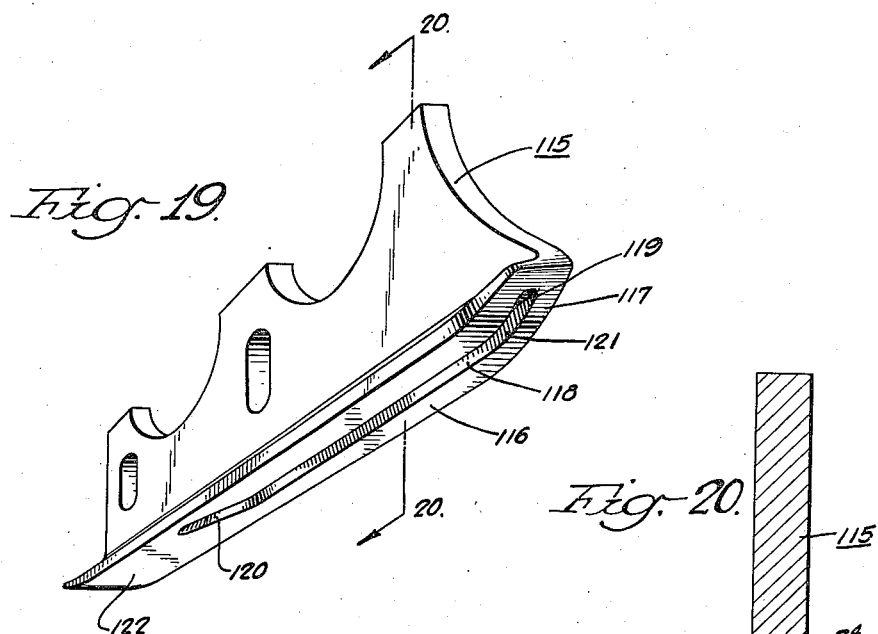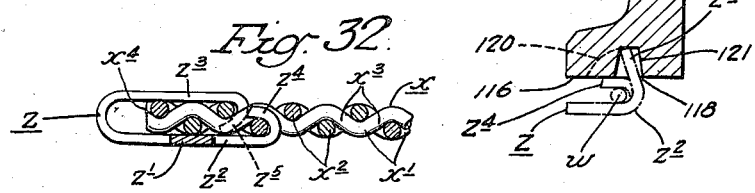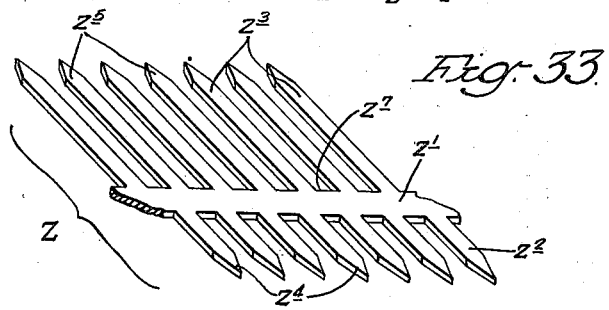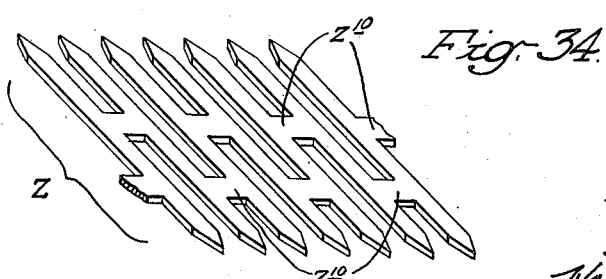

Jan. 17, 1939. A. J. HARRISON 2,144,570
MACHINE FOR APPLYING JOINT OR EDGE STRIPPING TO WIRE MESH SCREEN
Filed Aug. 26, 1937 15 Sheets-Sheet 14
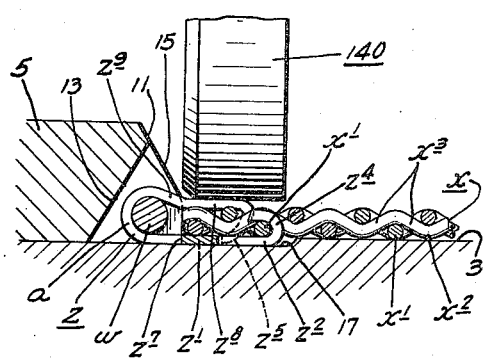
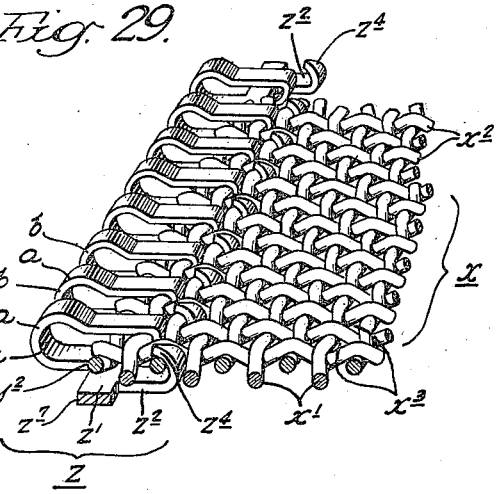
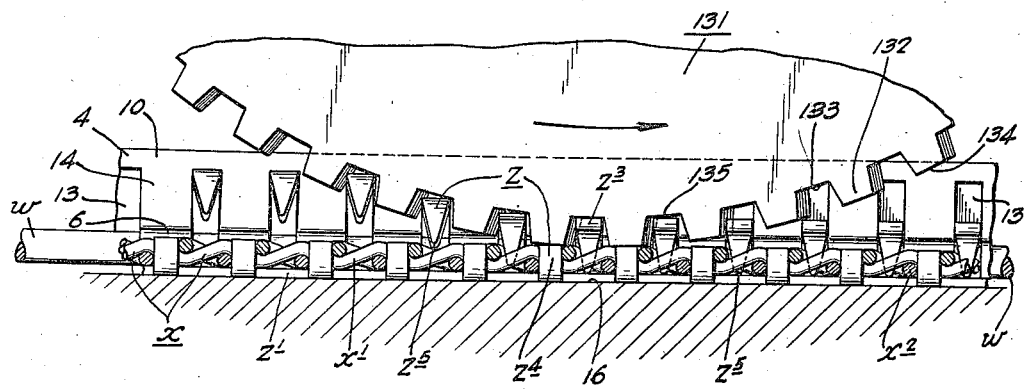
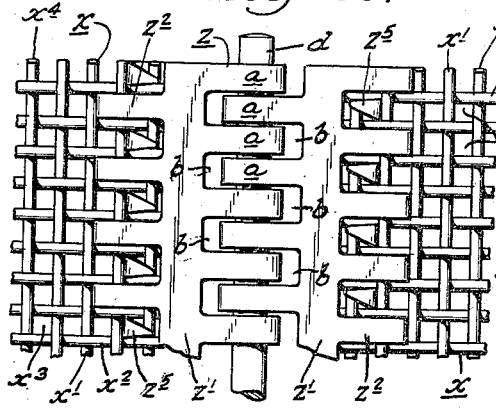
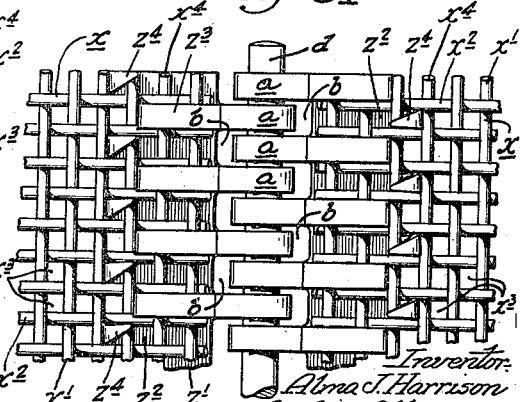

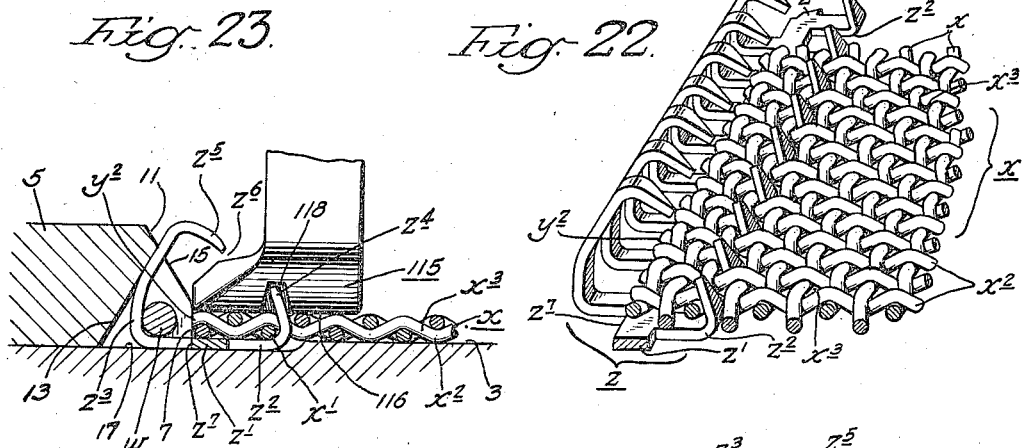
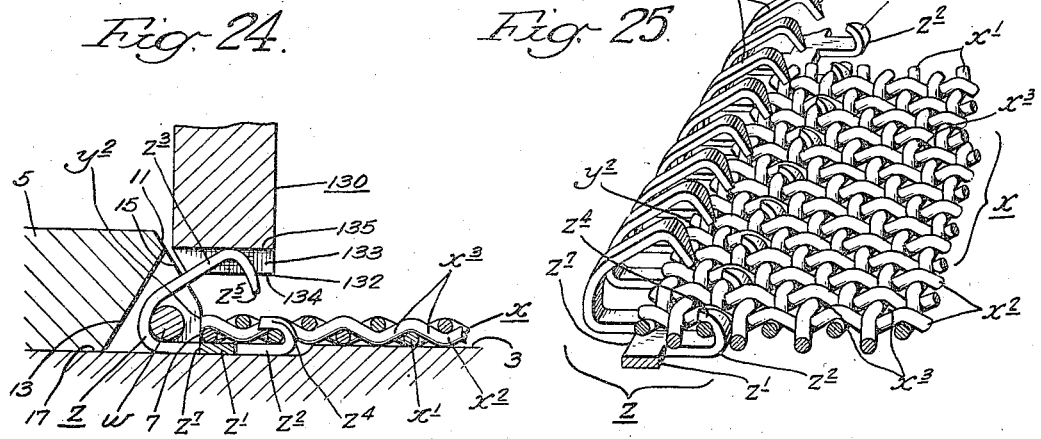
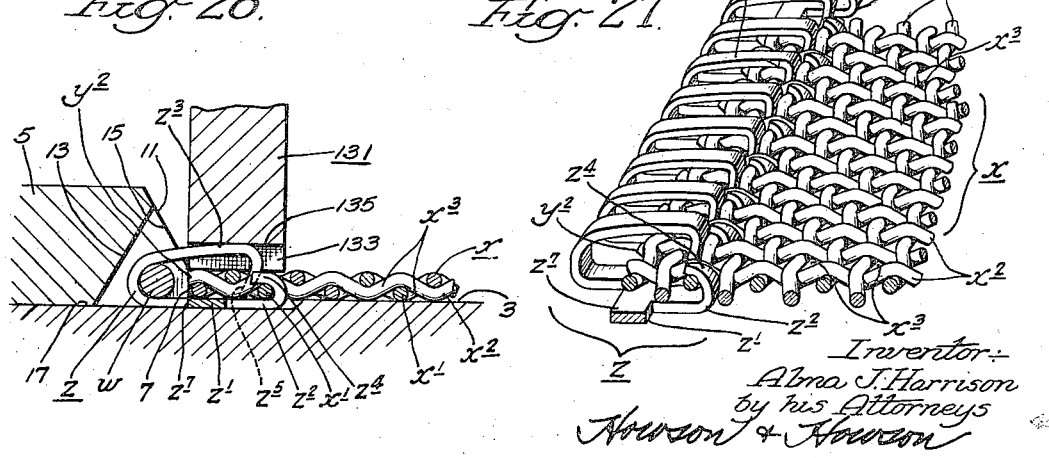

Patented Jan. 17, 1939

2,144,570

UNITED STATES PATENT OFFICE 2,144,570

MACHINE FOR APPLYING JOINT OR EDGE STRIPPING TO WIRE MESH SCREEN

Alma J. Harrison, Philadelphia, Pa., assignor to Proctor & Schwartz, Incorporated, Philadelphia, Pa., a corporation of Pennsylvania Application August 26, 1937, Serial No. 161,119

39 Claims. (Cl. 153—1)

This invention relates to an apparatus for applying hinge strips to opposite edges respectively of the units of wire mesh screen which collectively form the body of a conveyer apron of a jointed sectional type, such, for example, as that illustrated in U. S. Letters Patent No. 2,007,862, dated July 9, 1935.

In the sectional type of conveyer, especially in cases where the conveyer includes side chains composed of pivotally connected links, and which in some instances is provided with cross girts extending from one side chain of the conveyer to the opposite side chain thereof, and wherein the screening of which the body or apron of the conveyer is composed extends from side to side of the conveyer and is connected to the links of the side chains with longitudinally adjacent sections of the screen hinged or pivotally connected together transversely of the conveyer, it is especially important that the axes of the hinge joints connecting the successive screen sections or units be parallel to each other and in accurate axial alignment with the pintles of the links of the side chains, in order that the screen sections of a conveyer apron will pivot accurately and smoothly with the links of the side chains of the conveyer as the side chains pass around the sprocket wheels by which the conveyer as a whole is driven or guided.

It is also important that the screen units be made and maintained as flat as possible in order to prevent displacement of the material being transported by the conveyer, which is frequently of a loose nature laid in a substantially uniform layer on the screen, as the conveyer moves under load.

One object of the invention is to apply a hinge-forming strip to each of a pair of substantially parallel edges of each screen unit in a manner to form a multiplicity of hinge rod bearings along each of said edges, with the axes of the multiplicity of bearings in true axial alignment wtih each other across the full width of the conveyer section or unit, at each side thereof, with the bearings on one side in staggered relation to those on the opposite side of the unit.

Another object of the invention is to space the axes of the hinge rod bearings on the opposite sides of the unit accurately to a predetermined dimension between said axes.

Other objects of the invention, as will appear more fully hereinafter, are to line up the opposite edges of each unit parallel to each other preparatory to the securing of the hinge strips to the screen sections; to flatten each unit intermediate the parallel edges thereof; to form the axes of the hinge rod bearings on the opposite sides of the unit parallel to each other and to said aligned edges respectively, in spaced relation to said edges; and to anchor the hinge-forming strips rigidly to each screen section or unit in a manner to maintain the axes of the hinge bearings at the opposite sides of the unit in said accurate predetermined spaced relation to each other.

The construction and operation of the apparatus forming the subject of the present invention will be fully disclosed hereinafter, reference being had to the accompanying drawings; of which:

Figs. 1a, 1b and 1c collectively constitute a front elevation of the machine;

Figs. 2a, 2b and 2c collectively constitute a plan view of the machine shown in Figs. 1a, 1b and 1c respectively;

Fig. 3 is a fragmentary rear elevation of a portion of the mechanism shown in Figs. 1a and 2a;

Fig. 4 is a transverse sectional elevation taken on the line 4—4, Fig. 2a;

Fig. 5 is a transverse sectional elevation taken on the line 5—5, Fig. 2b;

Fig. 6 is a plan view of the mechanism shown in Fig. 5;

Fig. 7 is a longitudinal sectional elevation taken on the line 7—7, Fig. 6;

Fig. 8 is a longitudinal sectional elevation taken on the line 8—8, Fig. 6;

Fig. 9 is a sectional elevation taken on the line 9—9, Fig. 8;

Fig. 10 is a detached perspective view of a portion of the mechanism shown in Figs. 8 and 9;

Fig. 11 is an enlarged transverse sectional elevation taken on the line 11—11, Fig. 2b, showing the screen flattening and edge-aligning means in cooperating relation to each other, with the hinge strips in place to be secured to the opposite edges of the screen unit;

Figs. 12 and 13 are views similar to Fig. 11 but showing the edge-aligning and strip-holding elements in relatively different positions;

Fig. 14 is a detached perspective view of the pressure or flattening plate used in the apparatus and shown in operative position in Figs. 5 and 11 respectively;

Fig. 15 is a detached perspective view of the centering means for the pressure plate of Fig. 14;

Fig. 16 is an enlarged front elevation, partly in section, of a portion of the mechanism for controlling the pressure plate of Fig. 14;

Fig. 17 is a detached perspective view, partly in section, of the mechanism for actuating the pressure plate controlling means of Fig. 16;

Fig. 18 is a perspective view of a flexible removable mandrel wire around which the hinge rod bearings are formed and which also holds the hinge strips in place for and during the bearing-forming operation;

Fig. 19 is a detached perspective view of a prong bending and clinching shoe used in the apparatus for initially securing the hinge strips to the screen;

Fig. 20 is a transverse sectional elevation taken on the line 20—20, Fig. 19;

Fig. 21 is a fragmentary sectional elevation of one of the prong-bending wheels employed in the apparatus for closing a second set of prongs on the hinge strip around the bearing mandrel;

Fig. 22 is a fragmentary perspective view showing the initial set of prongs of the edging strip passed through the spaced openings in the wire mesh screening preparatory to bending and clinching by the shoe shown in Fig. 19;

Fig. 23 is a sectional elevation illustrating the initial set of prongs of the strip of Fig. 22 being acted upon by the clinching shoe of Figs. 19 and 20;

Fig. 24 is a view similar to Fig. 23 showing the second set of prongs of the hinge strip being acted upon by an initial bending wheel similar to that shown in Fig. 21;

Fig. 25 is a perspective view similar to Fig. 22 showing the screen and strip after having been acted upon by the shoe and wheel of Figs. 23 and 24 respectively;

Fig. 26 is a view similar to Fig. 24 but showing the secondary bending wheel acting upon the secondary prongs of the hinge strip;

Fig. 27 is a view similar to Figs. 22 and 25 and showing the screen and strip after being acted upon by the second bending wheel of Fig. 26;

Fig. 28 is a view similar to Fig. 26 but illustrating the screen and strip being acted upon by a final prong setting wheel to complete the hinge rod bearings and to anchor the strip permanently to the screen;

Fig. 29 shows the screen and strip of Figs. 22, 25 and 27 after engagement by the final setting wheel of Fig. 28;

Figure 1A:
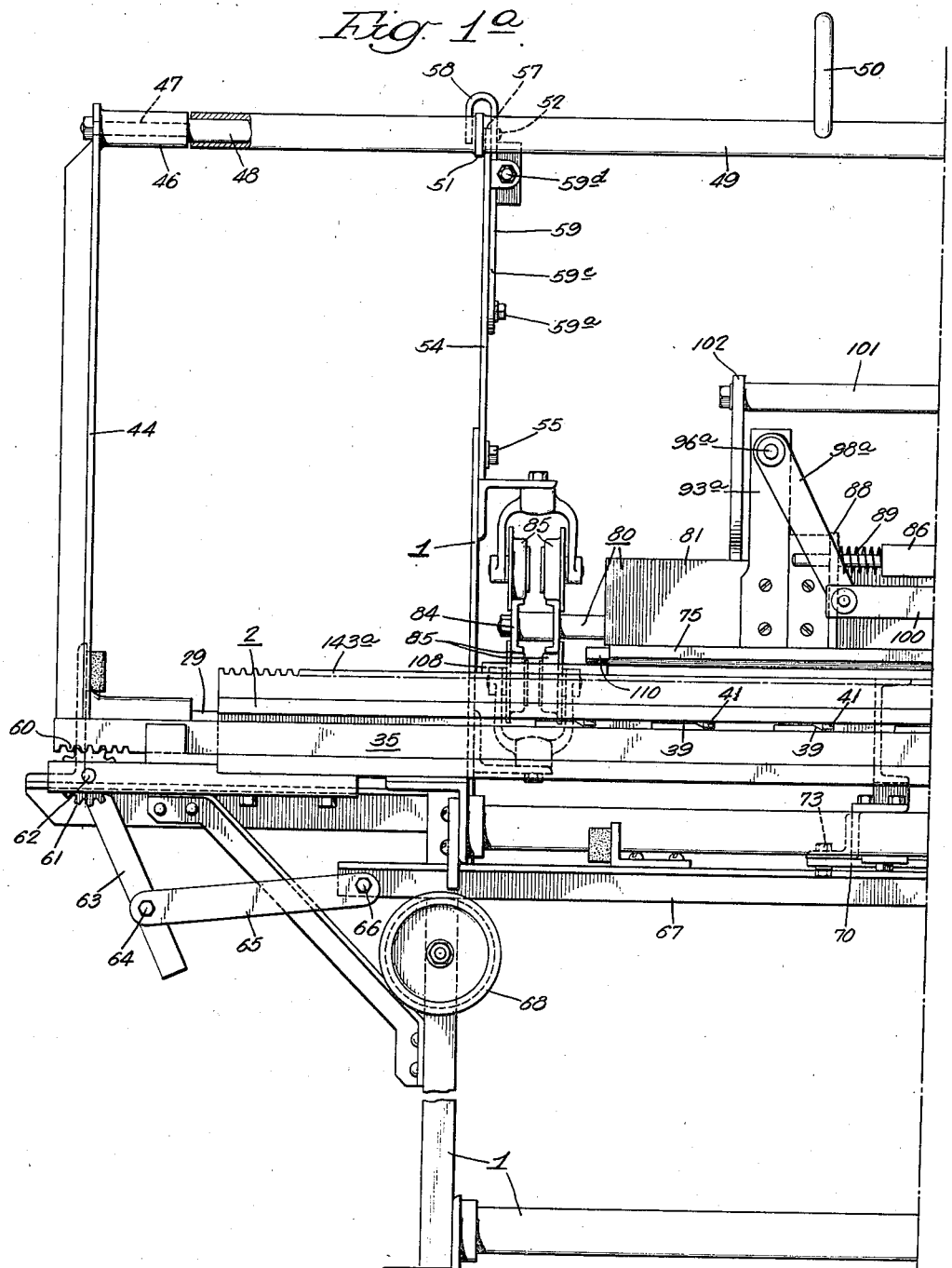

Figs. 30 and 31 are fragmentary views of the opposite faces of fragmentary portions of two sections or units of screen joined by a hinge rod passing through the staggered intermeshing bearings of the two units respectively secured to opposite edges of the two screen units and constituting the joint between two conveyer sections or the single joint between the opposite ends of a long strip of screening joined to form a continuous belt;

Fig. 32 is a transverse section through one longitudinal edge of a screen unit or continuous strip showing the hinge strip employed as a selvage or edge reinforcement;

Fig. 33 is a perspective view of the edging or hinge-forming strip in blank form prior to initial longitudinal bending for subsequent introduction into the machine; and Fig. 34 is a perspective view of a modified form of strip blank.

The construction of a wire mesh screen commonly used in conveyer aprons is clearly shown in Figs. 22 to 31 inclusive, wherein the screen $x$ is composed of longitudinal wires $x^1$ and transverse wires $x^2$ interwoven with each other and forming rectangular mesh openings $x^3$ therebetween.

The hinge or edging strip $z$ employed in the present instance includes a main body portion in the form of a relatively narrow longitudinal strip $z^1$. Projecting outwardly from one side and in the plane of the body strip $z^1$, as shown in Fig. 33, is a plurality or series of laterally spaced short prongs $z^2$. At and projecting outwardly from the opposite side of the body strip $z^1$, in staggered relation to the short prongs $z^2$, projects a series of relatively long prongs $z^3$.

The strip $z$ after being formed in the flat blank illustrated in Fig. 33 is bent transversely on a line substantially midway between the points $z^4$ and $z^5$ of the prongs $z^2$ and $z^3$ respectively, leaving the body strip $z^1$ and prongs $z^2$ lying in one plane and the long prongs $z^3$, throughout a substantial portion of their length lying in a plane approximately at 60° to the plane of the main body strip $z^1$ and prongs $z^2$.

The pointed tips $z^4$ and $z^5$ of the prong $z^2$ and $z^3$ respectively are respectively bent at an angle of about 60° to the planes of the major portions of the prongs, with a gap $z^6$ between the points as clearly shown in Figs. 11, 22 and 23.

The opposite longitudinal edges $y^1$ and $y^2$ of the screen $x$ are initially inserted in the gaps $z^6$ of the edge strips $z, z$ and pressed down into superposed relation to the small prongs $z^2$ and the body strip $z^1$, with the edges $y^1$ and $y^2$ substanially in alignment with those edges $z^7$ of the body strip $z^1$ from which the long prongs $z^3$ project and with the tips $z^4$ of the short prongs $z^2$ projecting upwardly through alternate spaces $x^3$ of the screen $x$, as clearly shown in Fig. 22.

The tips $z^4$ of the short prongs $z^2$ are then bent and clinched tightly around a longitudinal wire $x^1$ of the screen $x$ lying between the prong tips and the adjacent outer edge of the screen unit $x$, as clearly shown in Fig. 25.

The long prongs $z^3$ are then bent downwardly around a removable mandrel in the form of a flexible wire $w$, until the tips $z^5$ of said long prongs $z^3$ enter the openings $x^3$ of the screen $x$ which lie intermediate and in the next row removed from those through which the prong tips $z^4$ of the short prongs $z^2$ project.

The tips $z^5$ of the long prong $z^3$ are then clinched on the opposite face of the wire mesh fabric from that on which the points or tips $z^4$ of the short prongs $z^2$ are clinched, as clearly shown in Figs. 28 and 29.

The bending of the long prongs $z^3$ around the mandrel wire $w$ forms the long prongs $z^3$ into a series of axially aligned pivot rod strap bearings $a, a$ which alternate with recesses $b, b$ therebetween along each of the opposite sides or edges $y^1$ and $y^2$ of the screen unit $x$, with the axes of the rod-receiving openings $c$ of said strap bearings $a$ in axial alignment with each other and in spaced relation to the opposite edges $y^1$ and $y^2$ of the screen unit $x$; and with the bearing straps $a$ on the one edge $y^1$ of the unit $x$ disposed opposite the recesses $b$ along the opposite edge $y^2$ of the unit $x$; and with the axis $c$ of the edge strip $z$ lying along the edge $y^1$ of the unit $x$ in parallel relation to the axis $c$ of the edge or hinge strip $z$ disposed along the opposite edge $y^2$ of the unit $x$, whereby the units $x$—$x$ may be connected together by hinge rods $d$ for pivotal movement with respect to each other about the aligned axes $c, c$ and the coinciding axis of the rod $d$.

The opposite transversely extending ends $x^4$ of connected adjacent units $x, x$ are substantially in alignment with each other, due to the staggering of the bearing straps $a, a$ along the opposite longitudinal edges $y^1$ and $y^2$ of each unit $x$, for attachment to the links of the side chains of the conveyer when such side chains are employed.

The transverse edges $x^4$ of the screen sections or units of the sectional conveyer are normally secured to the links of the side chains of the conveyer in the manner illustrated in the above noted U. S. patent and in U. S. Patent No. 1,634,963, dated July 5, 1927, with the axes of the hinge rods $d$ in axial alignment with the chain pintles by which the links of the chains are pivotally connected to each other.

The hinge rods $d$ as shown in Figs. 30 and 31 pass through the staggered bearing straps $a$ of the two adjoining sections $x, x$ of the conveyer, to provide for pivotal movement of the one section with respect to the other when the links of the side chains of the conveyer pivot with respect to each other in passing around sprocket wheels which drive or guide the conveyer.

The apparatus for applying the edge or hinge strips $z$ to the screen sections $x$ comprises a framework 1 of any suitable construction. Mounted on the framework 1, in fixed relation thereto, is a table or bed 2 provided with an upper horizontally disposed surface 3 for receiving a section or unit of screen $x$.

At each of its opposite sides, and extending longitudinally of the table 2, are gauge bars 4 and 5 respectively. The gauge bars 4 and 5 are provided with inner vertical edges 6 and 7 which are adapted to engage the opposite longitudinal edges $y^1$ and $y^2$ respectively of the screen unit $x$ therebetween. The gauge edges 6 and 7 are spaced apart to a predetermined distance during the application of the edge or hinge strips $z, z$ thereto. This controls the ultimate width of the unit $x$ between its opposite longitudinal edges $y^1$ and $y^2$.

Spaced inwardly from the screen-engaging edges 6 and 7 of the gauge bars 4 and 5 and at a predetermined distance from said gauge edges, the gauge bars are bored longitudinally, substantially in the same plane as the unit $x$, as indicated at 8 and 9, for reception of the mandrel wires $w$.

The upper portions of the gauge edges 6 and 7 flare outwardly, as indicated at 10 and 11. The gauge edges of the gauge bars 4 and 5 are provided with a series of undercut grooves or recesses 12 and 13 respectively which are spaced apart along said gauge edges a distance substantially equal to the spacing of the long prongs $z^3$ of the edge strips $z$, for receiving those portions of the initially bent long prongs which eventually form the bearing straps $a, a$, in the manner shown in Fig. 13, and providing projections 14 and 15 between the recesses 12, 12 and 13, 13 respectively which extend into the spaces $b$ provided between the long prongs $z^3, z^3$ and the ultimate strap bearings $a, a$.

In addition to engaging the opposite edges $y^1$ and $y^2$ of each screen unit $x$, the forward edges 6 and 7 of the projections 14 and 15 engage the edges $z^7$ of the body strip $z^1$ of the strips $z$ and position the initially bent strips $z$ in definite predetermined relation to each other and to the edges $y_1$ and $y_2$ of the screen unit $x$ transversely across the table surface 3, with the initial longitudinal bends of the strips $z, z$ aligned with the bores 8 and 9 of the gauge bars 4 and 5 respectively, whereupon the mandrel wires $w$ are threaded through the bores 8 and 9 and through the bends of the strips $z, z$, whereby said strips $z, z$ are secured in definite positions on the table 2 for receiving the wire screen $x$ within the gaps $z^6$ of the edge or hinge strips $z, z$.

The screen-receiving surface 3 of the table 2 is provided with relatively shallow grooves along and parallel to its opposite longitudinal edges. The depth of the grooves below the screen-receiving surface 3 is substantially equal to the thickness of the metal of which the strips $z, z$ is composed.

The gauge bar 4 is held in a fixed position insofar as lateral movement is concerned but said bar is carried by a bar 18 which is arranged for vertical movement in a guide groove 19 formed in an overhanging portion 20 of and located at one side of the table 2.

The gauge bar 5 receives lateral as well as vertical movement and is secured to a bar 21 which is movable vertically and horizontally with respect to the screen-supporting surface 3 of the table 2.

The carrier bar 21 of the gauge bar 5 is provided at spaced intervals along its length with a plurality of laterally extending arms 22. The arms 22, 22 are mounted in recesses 23, 23 respectively which are formed in the body portion of the table 2. The inner ends of the arms 22 are provided with upper and lower arcuate surfaces 24 and 25 respectively which are formed on arcs swung from a common center 26. These concentric arcs function as a fulcrum for said drums by bearing against the upper and lower walls of the cavities 23, whereby the carrier bar 21 of the gauge bar 5 may be raised and lowered with respect to the screen-supporting surface 3 of the table 2. The carrier bar 21 with its gauge bar 5 secured thereto is movable laterally or transversely with respect to the screen-supporting surface 3, for purposes hereinafter set forth.

Movement of the carrier bar 21 and gauge bar 5 outwardly, that is, in the direction away from the relatively fixed gauge bar 4, is effected by means of springs 27 which are mounted in counterbores 28 formed in the table 2, one end of each spring bearing against the base of the counterbore with the opposite end of the spring bearing against the inner end of the arm 22.

Movement of the carrier bar 21 and gauge bar 5 inwardly, that is, toward the relatively fixed gauge bar 4, is accomplished by means of a heavy shaft 29 which is pivotally mounted on the table 2, beneath the said table, by means of bearing brackets 30. The shaft 29 is provided with lugs or arms 31 which project vertically through slots or recesses 32 formed in the table 2 and recesses 33 formed in the arms 22 of the carrier bar 21.

Vertical movement of the carrier bars 18 and 21, to which the gauge bars 4 and 5 are respectively secured is accomplished by means of a pair of cam bars 34 and 35 which extend longitudinally of the table 2 and are slidably mounted in guideways 36 and 37 formed in the table 2. The cam bars 34 and 35 are provided on their upper sides with cam surfaces 38 and 39. The cam surfaces 38 and 39 engage the lower ends of plungers 40 and 41 respectively which are vertically slidably mounted in bearing openings 42 and 43 formed in the table 2, beneath the carrier bars 18 and 21 respectively.

Rocking motion of the shaft 29, to move the gauge bar 5 toward and away from the gauge bar 4, is accomplished by means of arms 44 and 45 which are secured to the extreme opposite ends of the shaft 29 and projecting vertically therefrom.

The upper ends of the arms 44 and 45 are provided with bosses 46, 46 which receive reduced ends 47, 47 of a spacing bar 48. Pivotally mounted on the spacing bar 48 is a sleeve 49 from which project handles or levers 50, 50 arranged at spaced intervals along the sleeve 49.

The sleeve 49 is provided with a pair of relatively spaced horizontally disposed levers 51, 51 which extend rearwardly from the sleeve 49. The levers 51, 51 are provided at their rear ends with lugs or pins 52 which normally rest on horizontal surfaces 53 formed on brackets 54 which are adjustably mounted on the frame 1 by means of screws 55, as shown in Fig. 4.

The guage bar 5 is held in its innermost position, that is, its position nearest to the guage bar 4, against the action of the springs 27 which tend to move said guage bar 5 in the opposite direction, by the lugs or pins 52 on the arms 51 engaging shoulders 56 formed on the brackets 54.

To move the gauge bar 5 outwardly, i. e. in a direction away from the guage bar 4, the handles 50 are operated to rock the sleeve 49 and consequently the levers 51 until the lugs or pins 52 rise above the upper edges of the shoulders 56, whereupon said springs 27 assisted by manually pulling on the handles 50 rocks the shaft 29 and causes said lugs or pins 52 to ride along a horizontal surface 57 which is formed on the bracket 54 in elevated relation to the horizontal surfaces 53 thereon.

Upward movement of the levers 51 is limited by the upper ends 58 of stop levers 59 which project laterally over the levers 51 and function as stops for said levers. The levers 59 are pivotally connected at 59a to the brackets 54.

Outward movement of the guage bar 5 is limited by the lugs or pins 52 engaging sides 59b of the stop levers 59, the opposite sides 59c of said stop levers being engaged by adjustable abutments in the form of screws 59d carried by the brackets 54.

Inward movement of the gauge bar 5 toward the gauge bar 4 is resisted by the screen section itself which, as previously noted, has one edge $y^1$ in engagement with the gauge edge 6 of the relatively fixed gauge bar 4 and the opposite edge $y^2$ in engagement with the gauge surface 7 of the relatively movable gauge bar 5, when the movement of the bar 5 toward the bar 4 tends to compress the screen $x$ transversely. Lateral compression of the screen $x$ continues until the lugs or pins 52 drop behind the shoulders 56 and hold the gauge bar 5 in definite spaced relation to the gauge bar 4 with the screen unit $x$ under compression between the two on the surface 3 of the table 2.

Vertical movement of the gauge bars 4 and 5 with respect to the screen-supporting surface 3, as provided for by the longitudinal movement of the cam bars 34 and 35, is effected by the cam bars 34 and 35 being provided adjacent one end of each of said bars with a gear rack 60, the teeth of which intermesh with the teeth of pinions 61 which are secured to a shaft 62 which is rotatably mounted in the frame of the machine. The shaft 62 is provided with a lever 63 by which said shaft and gears 61 may be rotated or oscillated to provide longitudinal reciprocation of the cam bars 34 and 35 in unison.

Connected at 64 to the lever 63 is one end of a link 65, the opposite end of which is pivotally connected at 66 to an actuating bar 67. The actuating bar 67 extends along the front of the machine as shown in Figs. 1a, 1b and 1c within the reach of the operator and is mounted on rollers 68 which are rotatably supported on the frame 1 of the machine.

The actuating bar 67 is moved longitudinally by means of levers 70, 70, said levers extending horizontally through recesses 71 formed in plates or angle bars 72 which are secured to the actuating bar 67 and extend vertically therefrom. The rear ends of the levers 70 are pivoted at 73 to stationary portions of the frame 1.

By swinging one or the other or both of the levers 70 to the left, from the position shown in Figs. 1b and 1c, the actuating bar 67 is correspondingly moved to the left which, through the link 65 and lever 63, rocks the shaft 62 and gears 61 in a clockwise direction and transmits a reverse movement to the cam bars 34 and 35 which, through the cam surfaces 38 and 39 thereon, move the plungers 40 and 41 vertically in the table 2 with a consequent raising of the carrier bars 18 and 21 and the gauge bars 4 and 5 respectively carried thereby.

The vertical unisonal movement of the gauge bars 4 and 5 and the relative outward movement of the gauge bar 5 with respect to the gauge bar 4 is effected only at the time of releasing the screen section $x$ from the apparatus after the edge strips $z$, $z$ have been applied thereto and after the mandrel wires $w$ have been withdrawn from the bores 8 and 9 of the gauge bars 4 and 5 and out of the hinge rod bearings $a$ which have been formed around said mandrels.

The lateral compressive force under which the screen unit or section $x$ is placed, by movement of the gauge bar 5 toward the gauge bar 4 after the screen unit has been placed on the receiving surface 3 of the table 2, if the opposite edges $y^1$ and $y^2$ of the screen section have not been accurately cut tends to cause the screen section or unit $x$ to buckle upwardly from the surface 3 of the table 2 between the gauge bars 4 and 5. Such buckling is prevented or corrected by means of a pressure plate 75, shown particularly in Figs. 4, 5, 10 and 14.

The pressure plate 75 is adapted to be removed from the table 2 to lie behind said table in substantially parallel relation thereto, as indicated in Fig. 4, and for that reason said plate is adapted to be attached and detached to and from a carriage 80 which is movable horizontally toward and from the table 2.

The pressure plate 75 is adapted to be supported in its inoperative position clear of the table 2 by means of a pair of hooks 76, 76, shown in Figs. 1b and 16. The hooks 76, 76 are provided at their lower ends respectively with opposed inclined surfaces 76a, 76a. The lower ends of the hook members 76 are each arranged to enter a recess 77 formed in the upper surface of the pressure plate 75. One end of each of the recesses is provided with an undercut inclined surface 77a which, when the cooperating hook member 76 is in a substantially vertical position, is engaged by the inclined surface 76a of said hook member.

The inclined surfaces 76a, 76a of the two hook members 76, 76, which are arranged in spaced relation to each other, are disposed in opposite angles with respect to each other and the undercut surfaces 77a, 77a of the recesses 77, 77 respectively of the pressure plate 75 are correspondingly disposed at angles opposite to each other.

The hook members 76, 76 are pivotally mounted for movement in opposite directions about pivots 78, 78 which are carried by a front bar 79 of a rocking frame 81 which form part of the pressure plate carriage 80. The frame 81 of the carriage 80 also includes arms 82, 82 which are secured to and project rearwardly from the bar 79 and are pivotally mounted at their rear ends on a shaft 83 supported by the carriage 80. The opposite ends of the shaft 83 are secured in bars 84 forming part of the carriage 80 and which are mounted for horizontal reciprocation in the direction transversely to the table 2 between supporting and guide rollers 85, 85. The rollers 85 are rotatably supported in suitable bearings carried by the main frame of the machine.

Rocking of the hook members 76, 76 about their respective pivots 78, 78 simultaneously, in opposite directions, to release or to pick up the pressure plate 75, is effected by means of a pair of controlling bars 86, 86. The control bars 86, 86 are slidably mounted in bearings 87, 87 and 88, 88 carried by the front member 79 of the carriage 80. The control bars 86 are provided with laterally extending pins 86a, 86a which project into slots 76b formed in the upper ends of the hook members 76.

Movement of the control bars 86, 86 toward each other, to release the hooks 76, 76 from the pressure plate 75, is effected by compression springs 89, 89 confined between the extreme outer ends of the control bars 86, 86 respectively and the bearings 88, 88 in which said extreme outer ends of said control bars are slidably mounted.

The inner ends of the control bars 86, 86, which are slidably mounted in the bearings 87, 87, are provided with rollers 90 which bear against cam surfaces formed on the opposite edges 91, 91 respectively of a vertically reciprocable actuating bar 92. The actuating bar 92 is slidably mounted in a framework 93 carried by the front bar 79 of the carriage 80. One edge of the actuating bar 92 is provided with gear teeth 94 which intermesh with the teeth of a pinion 95. The pinion 95 is secured to a shaft 96 which is rotatably mounted in the framework 93. Also secured to the shaft 96 is a hub 97 of a crank handle 98. Turning of the crank 98 raises and lowers the actuating bar 92 and moves the cam surfaces formed on the opposite edges 91 thereof relative to the rollers 90 carried by the opposed inner ends of the axially aligned control bars 86, 86.

When the bars 86, 86 are moved in opposite directions by the cams 91, 91 the hook members 76 are actuated to pick up the pressure plate 75 and when said bars are moved in the opposite directions by the springs 89, said hooks release the pressure plate 75.

The outer end of the crank lever 98 is connected at 99 to an operating bar 100 which extends longitudinally of the machine and is connected at its opposite ends to crank levers 98a and 98c which are pivotally mounted at 96a and 96c respectively, to brackets 93a and 93c respectively, as shown in Figs. 1a and 1c, respectively, said brackets 93a and 93c, like the bracket 93, being secured to the front bar 79 of the pressure plate carriage 80.

Movement of the pressure plate 75 from its inoperative position behind the table 2, as shown in Fig. 4, to its operative position on the table 2, as shown in Fig. 11, is effected manually, through a horizontally extending handle bar 101. The handle bar 101 is secured at its opposite ends in levers 102, 102, which are secured to a shaft 103. The shaft 103 is rotatably mounted at its opposite ends in the slide bars 84, 84 of the carriage 80 and passes through openings 104 formed in the end members 82, 82 respectively of the pressure plate lifting frame 81. Within the openings 104 the shaft 103 is provided with oval-shaped cams 106, which, with the handle bar 101 in the full line position of Fig. 4, maintains the pressure plate frame 81 and the pressure plate 75 in an elevated position with respect to the slide bars 84 and to the screen-supporting surface 3 of the table 2. The levers 102, 102 bear against edges 107 of the carriage member 79, whereby the whole of the pressure plate supporting mechanism supported by the carriage 80 including the slide bars 84 and the frame 81 pivoted to said slide bars may be moved from the inoperative position shown in full lines in Fig. 4 to a position wherein the pressure plate 75 is in overlying relation to the screen-supporting surface 3 of the table 2, as shown in broken lines in Fig. 4, such movement being effected by pulling the handle bar 101 outwardly, toward the table 2, which causes the slide bars 84 to move through the supporting rollers 85 until the broken line position of the pressure plate is attained.

The pressure plate 75 is lowered from the broken line position of Fig. 4 to the full line position of Fig. 11 by moving the handle bar 101 rearwardly, from the full line position, Fig. 4, to the broken line position, Fig. 4, which causes the shaft 103 to rotate in the slide bars 84 with a corresponding rotation of the cams 106, which causes the frame 81 to swing about the pivot shaft 83. This lowers the pressure plate 75 to a position resting upon the screen $x$ which has been previously laid on the table 2.

With the pressure plate 75 in its low or screen-engaging position, the hooks 76 are operated from the full line positions in Fig. 16 to the broken line position in said figure, which releases the pressure plate 75, leaving the full weight thereof resting on the screen $x$.

Normally the dead weight of the pressure plate 75 flattens the screen $x$ between the lower face of the plate 75 and the screen-supporting surface 3 of the table 2, from the gauge bar 4 to the gauge bar 5, causing the wires of which the screen is composed to readjust themselves under the weight of the pressure plate 75 whereby any bulging or warping of the screen unit, as caused by the aligning of the opposite edges $y^1$ and $y^2$ by the gauge bars 4 and 5 in the manner above noted is corrected. This causes the screen $x$ to assume a perfectly flat condition in a single plane.

After releasing the pressure plate 75, in the manner noted, its supporting carriage 80 is returned to the inoperative position of Fig. 4 with the levers 102 remaining in the broken line position in said figure.

The pressure plate 75 is centered with respect to the gauge bars 4 and 5 by means of guide blocks 108 which are secured to the screen-supporting surface 3 of the table 2 adjacent the opposite ends respectively of the gauge bars 4 and 5, beyond the opposite transverse ends of the screen unit $x$, said blocks being recessed at 109, as shown in Figs. 2a, 2c and 15, for the reception of longitudinally projecting lugs or extensions 110 formed on or secured to the opposite ends respectively of the pressure plate 75.

The opposite edges 111 of the projections 110 are in downwardly converging relation to each other, for entrance between upwardly divergent edges 112, 112 of the recesses 109 of the guide blocks 108, 108 respectively, whereby as the plate 75 is lowered it is centered with respect to the table 2 and the screen unit $x$ supported thereon.

At this time the tips $z^4$ of the short prongs $z^2$ are projecting upwardly through the meshes $x^3$ of the screen $x$, as shown in Figs. 22 and 23. The screen $x$ is then pressed downwardly onto the edge strip $z$ to make a firm contact therebetween, after which the tips $z^4$ of the prongs $z^2$ are bent over and clinched around one of the longitudinal wires $x^1$ of the screen, as shown in Fig. 25.

The pressing of the edge of the screen $x^1$ down tightly onto the edge strips $z$, $z$ and the clinching of the tips $z^4$ of the prongs $z^2$ around the wire $z^1$ of the screen $x$ is effected by a pair of shoes 115, 115 which are movable longitudinally of the table 2 in the manner hereinafter set forth.

Each shoe 115 is provided with a flat under surface 116 which bears against the upper side or face of the screen $x$. At the leading end of the shoe 115 the pressing surface 116 thereof is inclined upwardly, as indicated at 117 in Fig. 19, to insure the riding of the shoe smoothly over the screen and the pressing of the screen down firmly to a given plane.

The pressing surface 116 and its upwardly inclined end 117 are provided with a longitudinal groove 118 into which the tips $z^4$ of the prongs $z^2$ project, as clearly shown in Fig. 23.

If desired, the leading end 119 of the groove 118 may flare outwardly to insure entrance of the prong tips $z^4$ into said groove as the shoes are moved along and relative to the screen unit $x$.

The main portion of the groove 118 extends substantially parallel to the side edges of the shoe 115, throughout the greater portion of the length of the groove. However, toward the rear end of said groove the groove extends at an angle to the main portion thereof, as indicated at 120 in Fig. 19. As each shoe 115 is moved along and relative to the screen, with the prong tips $z^4$ disposed in the groove 118, the side wall 121 of the groove 118 engages the prong tips $z^4$. As the prong tips enter the angular portion 120 of the groove 118 the side wall 121 thereof presses the prongs sidewise around the wire $x^1$, bending said prongs around said wire from the upright position of Figs. 20 and 23 to the horizontal position in Figs. 20 and 24. As the prongs are bent around said wire $x$ they ride out of the groove end 120 and under the plain tail end 122 of the pressure surface 116 of the shoe 115, which finishes the clinching of the prong tips $z^4$ around the wire $x^1$.

There is one of the shoes 115 operating at each of the opposite sides of the table 2 immediately adjacent the gauge bars 4 and 5 respectively.

The shoes 115, 115 are mounted on and at one end of a carriage 125 at opposite sides respectively of the table 2. The carriage 125 is movable longitudinally of the table 2. The carriage 125 is provided with supporting rollers 126, 126 which ride on the upper surfaces of tracks 127, 127 which are formed on and extend longitudinally of the table 2 and project outwardly from the opposite sides respectively thereof.

The carriage 125 is also provided with a series of retaining rollers 128 which ride the under surfaces of the laterally extending portions 20 of the table 2. These rollers prevent vertical movement of the carriage 125 and insure the shoes 115 pressing the screen $x$ down tightly against the horizontally disposed prongs $z^2$ of the edge strips $z$.

The carriage 125 is also provided wth a broad faced roller 129 which is rotatably mounted in said carriage and bears against the upper surface of the pressure plate 75, as the carriage travels along the table 2. During the travel of the roller 129 along the table 2 said roller applies additional pressure to the plate 75 and insures the flattening of the screen $x$ beneath said pressure plate and the supporting surface 3 of the table 2, in cases where the screen has warped to an abnormal extent, too great for correcting by the weight of the pressure plate 75 solely, the additional pressure applied by the roller 129 insures absolute flattening of the screen unit $x$ throughout its entire length and width.

Also carried by the carriage 125 is a pair of primary prong bending wheels 130, 130 which are disposed at opposite sides respectively of the carriage 125 immediately behind the pressing and clinching shoes 115, 115 and the pressure roller 129. Immediately following the primary bending wheels 130, 130 is a pair of secondary bending wheels 131, 131. Each of the wheels 130 and 131 is of similar construction. One of the wheels 130 is clearly shown in Fig. 21 as being provided with relatively spaced teeth 132, with intermediate recesses 133.

The peripheral faces 134 of the teeth 132 are arranged to align vertically with the prongs $z^2$ previously clinched by the shoes 115. The recesses 133 are arranged to align vertically with the relatively staggered long prongs $z^3$.

The peripheral surfaces 134, 134 of the wheels 130, 130 are set at a relatively greater height above the surface 3 of the table 2 than are the corresponding surfaces of the wheels 131, 131.

As the carriage 125 moves along the table 2, the teeth 132 of the wheels 130 enter in the spaces between the elevated long prongs $z^3$. The prongs $z^3$ after entering the recesses 133 are engaged by the base surfaces 135 of said recesses. Continued movement of the carriage 125, and consequent rotation of the wheels 130 causes the surfaces 135 thereof to exert downward pressure against the prongs $z^3$, bending the prongs around the mandrels $w$, as clearly shown in Figs. 24 and 25. The wheel 131 following each wheel 130, at each of the opposite sides of the table 2, and which is set closer to the screen-supporting surface 3 of the table, as noted above, then engages the partly bent and depressed long prong $z^3$, as indicated in Fig. 21.

As shown in Fig. 21, the outer peripheral surfaces 134 of the teeth 132 bear against the previously clinched prongs $z^2$ and hold the screen down firmly along its opposite edges as the bases 135 of the recesses 133 in the wheels 131 bear against the partially bent prongs $z^3$ and continue the bending thereof around the mandrel $w$, until the tip ends $z^5$ of said prong $z^3$ enter the meshes $x^3$ of the screen $x$, intermediate those previously entered by the prongs $z^2$ and in the row next adjacent to the row of meshes entered by the prong $z^2$, as clearly shown in Figs. 21, 26 and 27.

The wheels 131, 131 are followed immediately by setting wheels 140, 140 which, as shown in Fig. 28, are provided with plane peripheral surfaces which bear against the upper sides of the bent prongs $z^3$ and complete the bending of said prongs around the mandrels $w$, $w$ to finish forming the hinge bearing straps $a$ which are composed of the long prongs $z^3$.

The pressure of the setting wheels 140 presses the points $z^5$ of the prong $z^3$ against the depressed portions 16 and 17 of the screen-supporting surface 3, or, in other words, the surfaces which support the edging strips $z$. This clinches the tips $z^5$ of the long prongs $z^3$ around the under side of the screen wire $x^1$ which lies parallel to and immediately adjacent the wire $x^1$ about which the short prongs $z^2$ had been previously clinched.

The setting wheels 140 also press the portion $z^8$ of the prongs $z^3$ into parallel relationship with the plane of the screen and the plane of the main portion $z^1$ of the edging strip $z$. This forms an adjoining part $z^9$ of each prong at an angle to the flat part $z^8$ and tangent to the arc of the mandrel $w$ which completes the formation of the hinge strap bearings $a$.

The wheels 130, 130 are each permanently secured to a shaft 141 which is rotatably mounted adjacent its opposite ends in the opposite sides respectively of the carriage 125. Secured to the shaft 141 is a gear 142 which meshes with a gear rack 143. The gear rack 143 extends the full length of the table 2 and is secured to the lateral extension 20 on one side of the table 2, whereby, as the carriage 125 is propelled along said table, the wheels 130 are rotated at a definite peripheral speed substantially equal to the linear speed of travel of the carriage along the table, whereby the teeth of the wheels 130 are caused to register accurately with the prongs $z^3$ of the edge strips $z$.

In a like manner, the wheels 131, 131 are rigidly secured to a shaft 144 which, like the shaft 141, is rotatably mounted adjacent its opposite ends in the opposite sides respectively of the carriage 125 and is provided with a gear 145 which also meshes with the gear rack 143 and is rotated thereby. The shaft 144 drives the bending wheels 131 in the same manner as the bending wheels 130 are driven by the shaft 141 as the carriage 125 is propelled along the table 2.

The setting wheels 140, 140 are secured to a shaft 146 which is provided with a gear 147, also meshing with the gear rack 143 and revolving the setting wheels 140 at the same peripheral speed as the bending wheels 130 and 131. The shaft 146 is also rotatably mounted adjacent its opposite ends in the opposite sides respectively of the carriage 125.

Intermediate the wheels 140, 140 the shaft 146 is provided with a torque equalizer 148 which in the present instance merely consists of a longitudinally divided sleeve encircling the shaft 146 and secured adjacent its opposite ends respectively to the shaft 146 at opposite sides of a transverse cut 146a formed in said shaft and by which said shaft is divided into two separate parts on which the setting wheels 140, 140 are respectively mounted.

The shaft 146 is also provided with a gear wheel 149 which meshes with a pinion 150. The pinion is rotatably mounted on a stud 151 secured to the carriage 125. Secured to the pinion 150 and rotatably mounted on the stud 151 is a crank 152 which, when rotated about the axis of the stud 151, drives the pinion 150. The pinion 150 meshing with the gear 149 rotates the shaft 146 which through the gear 147 meshing with the gear rack 143 causes the carriage 125 to be moved in one direction or the other along the table 2.

In order to move the carriage 125 smoothly and accurately the shaft 146 is provided with a gear 147a corresponding to the gear 147 at the opposite side of the carriage 125 which meshes with the gear rack 143a corresponding to the gear rack 143 but located along the opposite edge of the table 2 from the rack 143. If desired, the shafts 141 and 144 on which the prong-bending wheels 130 and 131 are secured may be provided at the second side of the carriage 125 with gears 142a and 145a corresponding to the gears 142 and 145 respectively for meshing with the gear rack 143a.

In order to exert desired pressure of the setting wheels 140 on the screen $x$ said wheels are engaged at their upper sides by the opposite ends respectively of a pressure roll 153 which is secured to a shaft 154 rotatably mounted in the opposite sides of the carriage 125, in vertically extending slots 155 by which adjustment of the shaft 154 relative to the shaft 146 may be effected through adjusting screws 156 and 157.

Rotatably mounted in the carriage 125 after the setting wheels 140 is a second pressure roll 129a which, like the pressure roll 129, applies pressure to the upper side of the pressure plate 75. The pressure rolls 129 and 129a, like the pressure roll 153, are rotatably mounted on shafts 154 which are mounted in vertical slots 155 formed in the opposite sides respectively of the carriage 125 for adjustment toward and away from the pressure plate 75 by adjusting screws 156 and 157.

In order to regulate the pressure of the shoes 115 on the screen and the prongs of the edge strips, said shoes are respectively mounted on brackets 158, 158 which lie immediately adjacent the opposite side frames of the carriage 125 and are independently moved downwardly by adjusting screws 159 and upwardly by adjusting screws 160. By this means the lower screen-engaging faces 116 of said shoes 115 are maintained at a definite height above the screen-supporting surface 3 of the table 2, in vertically spaced relation thereto.

Each of the opposite side frames of the carriage 125 is provided with a relatively adjustable truck 161, shown in Fig. 10, which carries the carriage-supporting wheels 126. Each truck 161 is adjustable with respect to the carriage 125 by means of screws 162 and is held in adjusted position with respect to said carriage by securing screws 163, as clearly shown in Figs. 8 and 9.

In operation the carriage 125 is moved to the left hand end of the table 2 until a notch 164 in said carriage is engaged by a detent 165 carried by the main frame 1, see Fig. 3. This substantially locks the carriage 125 in an inoperative position. At that time the carriage 80 for the pressure plate 75, with said plate carried thereby, is in the inoperative position shown in Fig. 4. The gauge bars 4 and 5 are in their lower positions with the gauge bar 5 moved outwardly from the gauge bar 4, leaving the screen-supporting surface 3 of the table 2 clear and free ready for the reception of a screen unit $x$ and a pair of edge strips $z$, $z$ which are to be secured to the opposite edges respectively of the screen section, as in Fig. 13.

The edge strips $z$ are then placed in the depressed areas 16 and 17 adjacent the opposite longitudinal side edges of the screen-supporting surface 3 of the table 2. The edge strips $z$ are then moved toward the gauge bars 4 and 5 respectively with the initially bent long prongs $z^3$ of the strips $z$ disposed within the recesses 12 and 13 of the gauge bars 4 and 5 respectively.

The mandrel wires $w$, $w$ are then threaded through the openings 8 and 9 in the gauge bars 4 and 5 respectively and through the angle portions of the prongs $z^3$ lying in the recesses 12 and 13 throughout the full length of the gauge bars, which holds the edge strips $z$, $z$ in definite relationship to the gauge bars 4 and 5 respectively.

A screen section $x$ is then laid on the table surface 3 and the one edge $y^1$ thereof is inserted in the gap $z^6$ between the opposite staggered points $z^4$ and $z^5$ of the prongs $z^2$ and $z^3$ respectively of the edge strip $z$ which is secured to the gauge bar 4, until the edge $y^1$ of the screen section or unit $x$ is in abutting relation to the edge 6 of the gauge bar 4.

With the one edge $y^1$ of the screen unit $x$ inserted in the one edge strip $z$, the screen is permitted to drop flatly onto the supporting surface 3 of the table 2. This initially causes the tips $z^4$ of the short prongs $z^2$ of the edge strip carried by the gauge bar 4 to enter the meshes $x^3$ along the edge $y^1$ of said edge strip.

At this time, as noted above, the gauge bar 5 is in its outermost position. The handles 50 at that time are in the broken line position shown in Fig. 4. The handles 50 are then operated to rock the shaft 29, the handles 50 moving from the broken line position, Fig. 4, to the full line position in said figure and until the lugs or pins 52 drop behind the shoulders 56 on the brackets 54. Such rocking of the shaft 29 moves the gauge bar 5 inwardly. The upturned prong ends $z^4$ of the edge strip $z$ which is secured to the gauge bar 5 ride under the screen unit $x$ inwardly from the second edge $y^2$ thereof, until said edge $y^2$ of the screen unit engages the edge 7 of the gauge bar 5. As the rocking of the shaft 29 continues the edge $y^2$ is moved toward, aligned with, and made parallel to, the edge $y^1$ of the screen, by said edges of the screen being engaged by the edges 6 and 7 of the gauge bars 4 and 5 respectively.

The above noted movement of the bar 5 places the screen section $x$ under lateral compression, as the screen units are primarily cut slightly oversize rather than under size to insure of there being a proper amount of the screen available for securing the edge strips $z$, $z$ thereto. Such compression of the screen unit at times causes warping or bulging of the screen fabric upwardly from its supporting surface 3.

The pressure plate 75 is then deposited on top of the screen unit $x$ by operation of the carriage 80 in the manner above noted, whereby the pressure plate 75 is engaged by the aligning blocks 108 and rests on top of the screen unit $x$, intermediate the gauge bars 4 and 5, with the opposite longitudinal edges of the pressure plate 75 lying adjacent and spaced a little inwardly from the opposite edges $y^1$ and $y^2$ of the screen unit $x$.

The laying of the pressure plate 75 on the screen unit and the compressing of the unit between said pressure plate and the surface 3 of the table 2 under ordinary conditions flattens the screen unit over its entire area from end to end and side to side thereof. The weight of the pressure plate 75 and the fact that the pressure plate is prevented from accidental shifting relative to the table surface 3 retains the screen unit $x$ in a relatively fixed position on and with respect to the table 2.

With the pressure plate 75 in position as noted, the carriage 125 is then released from the detent 165 and is caused to travel longitudinally of the table 2, whereby additional pressure is applied to the screen by the pressure rollers 129, 129a. As the carriage 125 moves from the left hand end toward the right hand end of the table 2, as viewed in Figs. 1a, 1b, 1c and 2a, 2b, 2c, the shoes 115, 115 riding over the screen unit immediately adjacent the opposite edges $y^1$ and $y^2$ thereof first force the screen firmly down on tips $z^4$ of the short prongs $z^2$ of the edge strips $z$, $z$ and follow this by clinching said short prongs permanently to the screen unit as noted above.

The shoes 115, as noted above, are followed by the preliminary bending wheels 130 which bend the long prongs $z^3$ part way down around the mandrel wires $w$. The preliminary wheels 130, 130 are followed by the final bending wheels 131, 131, which, as noted above, bend the long prongs $z^3$ still further around the mandrel wires $w$ and cause the points $z^5$ of said prongs to enter the meshes $x^3$ of the unit $x$. These final or secondary bending wheels 131 are followed by the setting wheels 140 which press the long prongs $z^3$ still further down onto the screen unit with the portions $z^8$ of said prongs parallel to the plane of the screen unit $x$ and giving final shape to the bearing straps $a$ formed by the long prongs $z^3$.

When the carriage 125 has reached the right hand end of the table the application and final anchoring of the edge strip $z$ to the screen unit $x$ has been completed and the screen unit has been flattened therebetween by the weight of the pressure plate 75 and the additional pressure applied by the rollers 129 and 129a which have moved along the pressure plate 75 with and by the carriage 125.

The carriage 125 is then reversed and moved to the left end of the table 2 to be engaged by the detent 165. On this reverse movement the rollers 129 and 129a moving in contact with the upper surface of the pressure plate 75 give a final flattening to the assembled screen unit.

The carriage 80 is then moved forward until the hooks 76 overlie the apertures or recesses 77 of the pressure plate 75, whereupon the crank 98 is operated to rock the hooks 76 into gripping contact with the pressure plate 75. The handle bar 101 is then operated from the broken line position, Fig. 4, to the full line position in said figure which raises the pressure plate off the screen unit $x$, whereupon the pressure plate carriage 80 is moved into the full line position, Fig. 4, to remove the pressure plate from above the table 2.

The mandrel wires $w$ are then withdrawn from the gauge bars 4 and 5, which releases the assembled screen unit from said gauge bars. The gauge bars are then raised from the position shown in Fig. 11 to that shown in Fig. 12 to separate the gauge bars from the edge strips $z$, $z$ whereupon the handles 50 are again operated to release the lugs or pins 52 from the shoulders 56 and to rock the shaft 29, said handles 50 moving from the full line position, Fig. 4, to the broken line position therein and effecting the lateral movement of the gauge bar 5 away from the gauge bar 4 into the position of Fig. 12 where the assembled screen unit is ready to be removed from the assembling apparatus.

The cam bars 34 and 35 are then moved in the opposite direction to drop the gauge bars 4 and 5 from the position shown in Fig. 12 to that shown in Fig. 11 with the bar 5 still in an outward position as shown in Fig. 13. While in this position the edge strips for the next screen unit are attached to the gauge bars 4 and 5 respectively, by insertion of the mandrel wires $w$ in said gauge bars, whereupon the apparatus is ready to receive the next screen unit for application of the edge strips $z, z$ thereto.

Obviously, the mandrel wires $w$ may be removed and the gauge bars 4 and 5 raised clear of the assembled screen section before the pressure plate 75 is removed from the main body of the screen.

The operation as described provides the hinge bearing for one half of a hinge on each of the opposite edges respectively of each screen unit forming one of the sections of a sectional conveyer apron, with the axes of the hinge rod bearings accurately spaced apart a distance corresponding exactly to the spacing between the pintles of the links of the side chains of the conveyer in which such side chains are employed.

If desired, the tips $z^4$ of the short prongs $z^2$ may be projected through the screen and the screen pressed firmly down thereon manually, in preparation for the operation performed by the shoes 115, by use of a grooved block and hammer. This manual operation may be necessary or desirable in some instances, as for example, when the wire screening is composed of exceptionally heavy wire or when the spacing of the wires and the spacing of the points of the prongs do not substantially agree.

While the edge strips $z, z$ have been described above as being for the purpose of providing a hinge joint between successive sections of a sectional type conveyer apron, it will be understood that the same form of edge strip may be applied to the transverse edges of the apron sections, in substantially the same manner as described above, for the purpose of reinforcing the edges of the conveyer sections where they are joined to the side links of the conveyer.

In other instances, the edge strip may be applied to the longitudinal edges of a continuous strip of screening having its ends joined together to form an endless band, in which case the edge strips $z$ would be made of highly flexible and resilient material not readily fatigued by bending of the strip as the conveyer apron passes around guide drums or rollers.

To further assist in readily bending of the edge strips while the body of the conveyer apron is flexed in passing around guide drums, etc., an edge strip of the type shown in Fig. 34 may be employed, wherein the main body strip $z^1$ of the strip, in place of being in a continuous form, as shown in Fig. 33, may be broken up into small sections $z^{10}$ arranged in offset or staggered relation to each other and with respect to a logitudinal line extending through the center of the edge strip with the small sections of the longitudinal body strip $z^1$ spaced to each side of said central line in such a manner as to provide for the one section $z^{10}$ of the body strip lying on one face of the screen and the next section $z^{10}$ of the body strip lying on the opposite face of the screen when the edge strip is folded around the edge of the screen unit with the tips of the prongs projecting through the screen meshes from the opposite faces thereof and clinched on said opposite faces as noted above.

Under either of the above noted conditions, the machine would be constructed with the gauge bars 4 and 5 spaced apart, or in a manner capable of being spaced apart a distance sufficient to receive the full width of the conveyer apron therebetween, on the surface 3 of the table 2.

When the strips $z$ are employed as reinforcements for the longitudinal edges of a conveyer apron the mandrel wires $w$ may be eliminated or used only as a means for holding the edging strips in place while being folded or bent around the edges of the wire screening and while the tips of the prongs are being inserted through the meshes of the screen and clinched on the opposite faces respectively thereof.

I claim:

1. An apparatus for applying edge strips to opposite edges respectively of wire mesh screen, comprising means including an element disposed intermediate each of said opposite edges of the screen and the strip to be applied thereto for aligning the pair of said strips in parallel predetermined laterally spaced relation to each other, and means for securing said strips to said screen edges while maintained in said relationship by said intermediate elements.

2. An apparatus for applying edge strips to opposite edges respectively of wire mesh screen, comprising means including an element disposed intermediate each of said opposite edges of the screen and the strip to be applied thereto and means passing through perforations in said strips into engagement with the edges of said screen for aligning said screen edges with a pair of said strips in parallel predetermined laterally spaced relation to each other, and means for securing said strips to said screen edges while maintained in said relationship by said intermediate elements.

3. An apparatus for applying edge strips to opposite edges respectively of wire mesh screen, comprising means including an element disposed intermediate each of said opposite edges of the screen and the strip to be applied thereto for aligning the pair of said strips in parallel predetermined laterally spaced relation to each other, means for supporting said screen intermediate said spaced aligning means and extending across said screen from one to the other of said spaced aligning means, and means for securing said strips to said screen edges while maintained in said relationship by said intermediate elements.

4. An apparatus for applying edge strips to opposite edges respectively of wire mesh screen, comprising means for aligning a pair of said strips in parallel predetermined laterally spaced relation to each other, means for flattening said screen intermediate and extending from one to the other of said spaced aligning means, and means for securing said strips to said screen edges while maintained in said relationship.

5. An apparatus for applying edge strips to opposite edges respectively of wire mesh screen, comprising means for aligning a pair of said strips in parallel predetermined laterally spaced relation to each other, means for holding said screen rigidly in predetermined fixed position relative to and intermediate and extending from one to the other of said spaced aligning means, and means for securing said strips to said screen edges while maintained in said relationship.

6. An apparatus for applying edge strips to opposite edges respectively of wire mesh screen, comprising means including an element disposed intermediate each of said opposite edges of the screen and the strip to be applied thereto for aligning the pair of said strips in parallel predetermined laterally spaced relation to each other, means for folding said strips around said intermediate elements and said screen edges, and means for securing said strips to said screen edges while maintained in said relationship by said intermediate elements.

7. An apparatus for applying edge strips to opposite edges respectively of wire mesh screen, comprising means for aligning a pair of said strips in parallel predetermined laterally spaced relation to each other, means for forming hinge rod bearings in said strips with the axes of said bearings in parallel predetermined laterally spaced relation to each other, and means for securing said strips to said screen edges while maintained in said relationship.

8. An apparatus for applying edge strips to opposite edges respectively of wire mesh screen, comprising means for aligning a pair of said strips in parallel predetermined laterally spaced relation to each other, means for folding said strips around said screen edges, means for forming hinge rod bearings in said strips during said folding of said strips with the axes of said bearings in parallel predetermined laterally spaced relation to each other, and means for securing said strips to said screen edges while maintained in said relationship.

9. An apparatus for applying edge strips to opposite edges respectively of wire mesh screen, comprising means including an element disposed intermediate each of said opposite edges of the screen and the strip to be applied thereto for holding the pair of said strips in laterally spaced relation to each other to receive said opposite edges of said screen, means for aligning said pair of strips in parallel predetermined laterally spaced relation to each other, and means for securing said strips to said screen edges while maintained in said relationship by said intermediate elements.

10. An apparatus for applying edge strips to opposite edges respectively of wire mesh screen, comprising means including an element disposed intermediate each of said opposite edges of the screen and the strip to be applied thereto for holding the pair of said strips in laterally spaced relation to each other to receive said opposite edges of said screen, means for aligning said pair of strips in parallel predetermined laterally spaced relation to each other, means for folding said strips around said screen edges and said holding means to form hinge rod bearings in said strips in predetermined laterally spaced relation to each other, and means for securing said strips to said screen edges while maintained in said relationship by said intermediate elements.

11. An apparatus for applying edge strips to opposite edges respectively of wire mesh screen, comprising means including an element disposed intermediate each of said opposite edges of the screen and the strip to be applied thereto for holding the pair of said strips in laterally spaced relation to each other to receive said opposite edges of said screen, means for aligning said pair of strips in parallel predetermined laterally spaced relation to each other, means for holding said screen rigidly in predetermined fixed position relative to and intermediate said spaced aligning means, means for folding said strips around said screen edges and said holding means to form hinge rod bearings in said strips in predetermined laterally spaced relation to each other, and means for securing said strips to said screen edges while maintained in said relationship by said intermediate elements.

12. An apparatus for applying edge strips to opposite edges of a wire screen, comprising means including an element disposed intermediate each of said opposite edges of the screen and the strip to be applied thereto for aligning said edges in parallel relation to each other, means for aligning said edge strips with said screen edges respectively including means passing through perforations in said strips into engagement with the edges of the screen, means extending between and substantially from one to the other of said aligning means for flattening and holding said screen rigidly between said edge-aligning means, means for folding said edge strips around said screen edges, and means for securing said edge strips to said screen edges.

13. An apparatus for applying edge strips to opposite edges of a wire screen, comprising means including an element disposed intermediate each of said opposite edges of the screen and the strip to be applied thereto for holding said edge strips in predetermined positions to receive the opposite edges respectively of said screen, means for aligning said screen edges in parallel relation to each other including means passing through perforations in said strips into engagement with the edges of the screen, means for aligning said edge strips with said screen edges respectively, means for flattening and rigidly holding said screen between said edge-aligning means, means for folding said edge strips around said screen edges, and means for securing said edge strips to said screen edges.

14. An apparatus for applying edge strips to opposite edges of a wire screen, comprising means for holding said edge strips in predetermined positions to receive the opposite edges respectively of said screen, means for aligning said screen edges in parallel relation to each other, means for aligning said edge strips with said screen edges respectively, means for flattening and rigidly holding said screen between said edge-aligning means, means for folding said edge strips around said screen edges, means for securing said edge strips to said screen edges, and means for forming bearings in the folds of said strips adjacent the edges of said screen around which said strips are respectively folded.

15. An apparatus for applying to opposite edges of wire mesh screen edge strips each having series of prongs spaced along opposite edges respectively of said strips, comprising means for forcing the series of prongs along one edge of each strip through meshes of said screen, means for folding said strips around said edges of said screen, means for forcing the series of said prongs along the second edges of the strips through meshes of said screen adjacent those through which the first series of prongs were forced, and means for clinching said prongs.

16. An apparatus for applying to opposite edges of wire mesh screen edge strips each having series of prongs spaced along opposite edges respectively of said strips, comprising means cooperating with the prongs along one edge of each strip for holding said strips in predetermined positions to receive the opposite edges of said screen, means for forcing the series of prongs along one edge of each strip through meshes of said screen, means for folding said strips around said edges of said screen, means for forcing the series of said prongs along the second edges of the strips through meshes of said screen adjacent those through which the first series of prongs were forced, and means for clinching said prongs.

17. An apparatus for applying to opposite edges of wire mesh screen edge strips each having series of prongs spaced along opposite edges respectively of said strips, comprising means cooperating with the prongs along one edge of each strip for holding said strips in predetermined positions to receive the opposite edges of said screen, means for aligning said edges of said screen and said edge strips with said screen edges respectively, means for forcing the series of prongs along one edge of each strip through meshes of said screen, means for folding said strips around said edges of said screen, means for forcing the series of said prongs along the second edges of the strips through meshes of said screen adjacent those through which the first series of prongs were forced, and means for clinching said prongs.

18. An apparatus for applying to opposite edges of wire mesh screen edge strips each having series of prongs spaced along opposite edges respectively of said strips, comprising means cooperating with the prongs along one edge of each strip for holding said strips in predetermined positions to receive the opposite edges of said screen, means for aligning said edges of said screen and said edge strips with said screen edges respectively, means for flattening said screen between said edges thereof, means for forcing the series of prongs along one edge of each strip through meshes of said screen, means for folding said strips around said edges of said screen, means for forcing the series of said prongs along the second edges of the strips through meshes of said screen adjacent those through which the first series of prongs were forced, and means for clinching said prongs.

19. An apparatus for applying to opposite edges of wire mesh screen edge strips each having series of prongs spaced along opposite edges respectively of said strips, comprising means cooperating with the prongs along one edge of each strip for holding said strips in predetermined positions to receive the opposite edges of said screen, means for aligning said edges of said screen and said edge strips with said screen edges respectively, means for flattening said screen between said edges thereof, means for forcing the series of prongs along one edge of each strip through meshes of said screen, means for folding said strips around said edges of said screen, means for forcing the series of said prongs along the second edges of the strips through meshes of said screen adjacent those through which the first series of prongs were forced, means for clinching said prongs, and means for forming bearings in the folds of said strips adjacent the edges of the screen around which said strips are respectively folded.

20. An apparatus for applying to opposite edges of wire mesh screen edge strips each having series of prongs spaced along opposite edges respectively of said strips, comprising means cooperating with the prongs along one edge of each strip for holding said strips in predetermined positions to receive the opposite edges of said screen, means for aligning said edges of said screen and said edge strips with said screen edges respectively, means for flattening said screen between said edges thereof, means for forcing the series of prongs along one edge of each strip through meshes of said screen, means for folding said strips around said edges of said screen, means for forcing the series of said prongs along the second edges of the strips through meshes of said screen adjacent those through which the first series of prongs were forced, means for clinching said prongs, means for forming bearings in the folds of said strips adjacent the edges of the screen around which said strips are respectively folded, and means for staggering the bearings along one edge of the screen with respect to the bearings along the opposite edge of the screen.

21. An apparatus for applying to opposite edges of wire mesh screen edge strips each having series of prongs spaced along opposite edges respectively of said strips, comprising means cooperating with the prongs along one edge of each strip for holding said strips in predetermined positions to receive the opposite edges of said screen, means for aligning said edges of said screen and said edge strips with said screen edges respectively, means for flattening said screen between said edges thereof, means for forcing the series of prongs along one edge of each strip through meshes of said screen, means for folding said strips around said edges of said screen, means for forcing the series of said prongs along the second edges of the strips through meshes of said screen adjacent those through which the first series of prongs were forced, means for clinching said prongs, means for forming bearings in the folds of said strips adjacent the edges of the screen around which said strips are respectively folded, and means for setting the axes of said bearings at a predetermined distance apart transversely of said screen.

22. An apparatus for applying edge strips to opposite edges of a wire mesh screen, comprising a pair of relatively movable gauge bars spaced apart for accommodation of said screen therebetween with at least one of said bars freely movable normally with respect to the other of said bars, and means for actuating said gauge bars into contact with the opposite edges of said screen for aligning said edges parallel to each other.

23. An apparatus for applying edge strips to opposite edges of a wire mesh screen, comprising a pair of relatively movable gauge bars spaced apart for accommodation of said screen therebetween with at least one of said bars freely movable normally with respect to the other of said bars, means for connecting said edge strips to said gauge bars respectively to receive said screen edges, and means for actuating said gauge bars into contact with the opposite edges of said screen for aligning said edges parallel to each other with said strips aligned with said edges respectively.

24. An apparatus for applying a pair of edge strips to opposite edges respectively of wire mesh screen wherein said strips each include a series of laterally spaced outwardly extending prongs, said apparatus comprising a pair of parallel laterally spaced gauge bars each provided with a series of recesses for receiving the prongs of said strips respectively, and a series of projections for extending into the spaces between said prongs and provided with axially aligned openings adapted to receive wires passed through said openings and across the recesses between the projections and the prongs disposed in said recesses for holding said strips in predetermined relation to each other for receiving said edges of said screen.

25. An apparatus for applying a pair of edge strips to opposite edges respectively of wire mesh screen wherein said strips each include a series of laterally spaced outwardly extending prongs, said apparatus comprising a pair of parallel laterally spaced gauge bars each provided with a series of recesses for receiving the prongs of said strips respectively, a series of projections for extending into the spaces between said prongs and provided with axially aligned openings, a pair of wires passing through said aligned openings of said gauge bars respectively and across said recesses and the prongs located therein for holding said strip in predetermined positions to receive the edges of the screen, and means for moving said gauge bars one relative to the other into contact with opposite edges of said screen for aligning the screen edges and said strips parallel to each other.

26. An apparatus for applying a pair of edge strips to opposite edges respectively of wire mesh screen, said apparatus comprising a pair of parallel laterally spaced gauge bars, means for holding said strips in predetermined positions relative to said gauge bars to receive the edges of the screen, means for moving said gauge bars one relative to the other into contact with opposite edges of said screen for aligning the screen edges and said strips parallel to each other, and a pair of flat surfaced elements disposed in contact with the opposite faces of the screen respectively for flattening and holding the screen therebetween intermediate said aligned edges thereof.

27. An apparatus for applying a pair of edge strips to opposite edges respectively of wire mesh screen, said apparatus comprising a pair of parallel laterally spaced gauge bars, means for holding said strips in predetermined positions relative to said gauge bars to receive the edges of the screen, means for moving said gauge bars one relative to the other into contact with opposite edges of said screen for aligning the screen edges and said strips parallel to each other, a pair of flat surfaced elements disposed in contact with the opposite faces of the screen respectively for flattening and holding the screen therebetween intermediate said aligned edges thereof, and a carriage movable longitudinally of said flattening elements and exerting screen-flattening pressure between said elements.

28. An apparatus for applying a pair of edge strips to opposite edges respectively of wire mesh screen, said apparatus comprising a pair of parallel laterally spaced gauge bars, means for holding said strips in predetermined positions relative to said gauge bars to receive the edges of the screen, means for moving said gauge bars one relative to the other into contact with opposite edges of said screen for aligning the screen edges and said strips parallel to each other, a table provided with a flat screen-supporting surface intermediate said gauge bars, and a pressure plate overlying said table surface and the screen thereon and pressing said screen into flattening contact with said table surface.

29. An apparatus for applying a pair of edge strips to opposite edges respectively of wire mesh screen, said apparatus comprising a pair of parallel laterally spaced gauge bars, means for holding said strips in predetermined positions relative to said gauge bars to receive the edges of the screen, means for moving said gauge bars one relative to the other into contact with opposite edges of said screen for aligning the screen edges and said strips parallel to each other, a table provided with a flat screen-supporting surface intermediate said gauge bars, a pressure plate overlying said table surface and the screen thereon and pressing said screen into flattening contact with said table surface, a carriage movable longitudinally of said table, and rollers on said carriage exerting additional screen-flattening pressure on said pressure plate.

30. An apparatus for applying a pair of edge strips to opposite edges respectively of wire mesh screen, said apparatus comprising a pair of parallel laterally spaced gauge bars, means for holding said strips in predetermined positions with respect to said gauge bars to receive the edges of the screen, means for moving said gauge bars one relative to the other into contact with opposite edges of said screen for aligning the screen edges and said strips parallel to each other, a table provided with a flat screen-supporting surface intermediate said gauge bars, a pressure plate overlying said table surface and the screen thereon and pressing said screen into flattening contact with said table surface, a pressure plate carriage operable transversely of said table, and means on said carriage for raising and lowering said pressure plate relative to said table.

31. An apparatus for applying a pair of edge strips to opposite edges respectively of wire mesh screen, said apparatus comprising a pair of parallel laterally spaced gauge bars, means for holding said strips in predetermined positions with respect to said gauge bars to receive the edges of the screen, means for moving said gauge bars one relative to the other into contact with opposite edges of said screen for aligning the screen edges and said strips parallel to each other, a table provided with a flat screen-supporting surface intermediate said gauge bars, a pressure plate overlying said table surface and the screen thereon and pressing said screen into flattening contact with said table surface, a pressure-plate carriage operable transversely of said table, means on said carriage for raising and lowering said pressure plate relative to said table, and means for moving said carriage and the plate carried thereby transversely of said table to remove said plate to an inoperative position at one side of said table.

32. An apparatus for applying a pair of edge strips to opposite edges respectively of wire mesh screen wherein said strips each include two sets of laterally spaced prongs extending in opposite directions from a main longitudinal strip, said apparatus comprising a screen-supporting table, a pair of gauge bars at opposite sides respectively of said table and each provided with a series of recesses for receiving one set of prongs of one of said edge strips respectively, a series of projections on each gauge bar extending into the spaces between said prongs and engaging the longitudinal strips of said edge strips, wires passing through axially aligned openings in said projections across the recesses therebetween and the prongs disposed in said recesses, and means for moving said gauge bars relative to said table and one with respect to the other to cause said projections to engage the opposite edges respectively of said screen to align said screen edges and said longitudinal strips parallel with each other.

33. An apparatus for applying a pair of edge strips to opposite edges respectively of wire mesh screen wherein said strips each include two sets of laterally spaced prongs extending in opposite directions from a main longitudinal strip, said apparatus comprising a screen-supporting table, a pair of gauge bars at opposite sides respectively of said table and each provided with a series of recesses for receiving one set of prongs of one of said edge strips respectively, a series of projections on each gauge bar extending into the spaces between said prongs and engaging the longitudinal strips of said edge strips, wires passing through axially aligned openings in said projections across the recesses therebetween and the set of prongs disposed in said recesses, a carriage movable longitudinally of said table, and a pair of shoes on opposite faces respectively of said carriage and pressing the second set of prongs of each edge strip through meshes in said screen.

34. An apparatus for applying a pair of edge strips to opposite edges respectively of wire mesh screen wherein said strips each include two sets of laterally spaced prongs extending in opposite directions from a main longitudinal strip, said apparatus comprising a screen-supporting table, a pair of gauge bars at opposite sides respectively of said table and each provided with a series of recesses for receiving one set of prongs of one of said edge strips respectively, a series of projections on each gauge bar extending into the spaces between said prongs and engaging the longitudinal strips of said edge strips, wires passing through axially aligned openings in said projections across the recesses therebetween and the set of prongs disposed in said recesses, a carriage movable longitudinally of said table, a pair of shoes on opposite sides respectively of said carriage and pressing the second set of prongs of each edge strip through meshes in said screen, said shoes being respectively provided with prong-receiving grooves arranged to bend the prongs engaged by said shoes about mesh-forming wires of said screen respectively, and flat surfaces on said shoes arranged to follow said bending grooves to clinch the bent prongs around said wires.

35. An apparatus for applying a pair of edge strips to opposite edges respectively of wire mesh screen wherein said strips each include two sets of laterally spaced prongs extending in opposite directions from a main longitudinal strip, said apparatus comprising a screen-supporting table, a pair of gauge bars at opposite sides respectively of said table and each provided with a series of recesses for receiving one set of prongs of one of said edge strips respectively, a series of projections on each gauge bar extending into the spaces between said one set of prongs and engaging the longitudinal strips of said edge strips, a pair of strip-holding wires passing through axially aligned openings in said projections across the recesses therebetween and the set of prongs disposed in said recesses, a carriage movable longitudinally of said table, a pair of prong-engaging wheels carried by and at opposite sides respectively of said carriage and arranged to initially bend the set of prongs in said recesses around said holding wires, and a pair of secondary bending wheels on said carriage and arranged to engage said initially bent prongs to increase the bending of the initially bent prongs around said holding wires.

36. An apparatus for applying a pair of edge strips to opposite edges respectively of wire mesh screen wherein said strips each include two sets of laterally spaced prongs extending in opposite directions from a main longitudinal strip, said apparatus comprising a screen-supporting table, a pair of gauge bars at opposite sides respectively of said table and each provided with a series of recesses for receiving one set of prongs of one of said edge strips respectively, a series of projections on each gauge bar extending into the spaces between said one set of prongs and engaging the longitudinal strips of said edge strips, holding wires passing through axially aligned openings in said projections across the recesses therebetween and the set of prongs disposed in said recesses, a carriage movable longitudinally of said table, a pair of prong-engaging wheels carried by and at opposite sides respectively of said carriage and arranged to initially bend the set of prongs in the recesses around said holding wires, a pair of secondary bending wheels on said carriage and arranged to engage said initially bent prongs to increase the bending of the initially bent prongs around said holding wires and to force said bent prongs through meshes of said screen, and a pair of setting wheels carried by said carriage and arranged to engage said bent prongs and to clinch said prongs to said screen.

37. An apparatus for applying a pair of edge strips to opposite edges respectively of wire mesh screen wherein said strips each include two sets of laterally spaced prongs extending in opposite directions from a main longitudinal strip, said apparatus comprising a screen-supporting table, a pair of gauge bars at opposite sides respectively of said table and each provided with a series of recesses for receiving one set of prongs of one of said edge strips respectively, a series of projections on each gauge bar extending into the spaces between said prongs and engaging the longitudinal strips of said edge strips, wires passing through axially aligned openings in said projections across the recesses therebetween and the prongs disposed in said recesses, means for moving said gauge bars relative to said table and one with respect to the other to cause said projections to engage the opposite edges respectively of said screen to align said screen edges and said longitudinal strips parallel with each other, means for folding said edge strips around the said wires and the edges of said screen adjacent said wires, and means for actuating said gauge bars to release said edge strips from said gauge bars subsequent to withdrawal of said wires from said gauge bars.

38. An apparatus for applying a pair of edge strips to opposite edges respectively of wire mesh screen wherein said strips each include two sets of laterally spaced prongs extending in opposite directions from a main longitudinal strip, said apparatus comprising a screen-supporting table, a pair of gauge bars at opposite sides respectively of said table and each provided with a series of recesses for receiving one set of prongs of one of said edge strips respectively, a series of projections on each gauge bar extending into the spaces between said prongs and engaging the longitudinal strips of said edge strips and the opposite edges respectively of said screen, means for moving said gauge bars one with respect to the other and to the table for compressing said screen transversely between said gauge bars, means for securing said gauge bars in predetermined spaced relation to each other with the screen held therebetween, and means for flattening the screen intermediate said gauge bars.

39. An apparatus for applying a pair of edge strips to opposite edges respectively of wire mesh screen wherein said strips each include two sets of laterally spaced prongs extending in opposite directions from a main longitudinal strip, said apparatus comprising a screen-supporting table, a pair of gauge bars at opposite sides respectively of said table and each provided with a series of recesses for receiving one set of prongs of one of said edge strips respectively, a series of projections on each gauge bar extending into the spaces between said prongs and engaging the longitudinal strips of said edge strips and the opposite edges respectively of said screen, means for moving said gauge bars one with respect to the other and to the table for compressing said screen transversely between said gauge bars, means for securing said gauge bars in predetermined spaced relation to each other with the screen held therebetween, means for flattening the screen intermediate said gauge bars, and means for securing said prongs in said screen while the screen is held between the gauge bars and flattening means.

ALMA J. HARRISON.